(12) United States Patent
Stratigos, Jr.

(10) Patent No.: US 9,584,193 B2
(45) Date of Patent: *Feb. 28, 2017

(54) METHODS AND SYSTEMS FOR A DISTRIBUTED RADIO COMMUNICATIONS NETWORK

(71) Applicant: Cognosos, Inc., Atlanta, GA (US)

(72) Inventor: James A. Stratigos, Jr., Atlanta, GA (US)

(73) Assignee: Cognosos, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/711,413

(22) Filed: May 13, 2015

(65) Prior Publication Data

US 2015/0249486 A1 Sep. 3, 2015

Related U.S. Application Data

(63) Continuation of application No. 13/690,602, filed on Nov. 30, 2012, now Pat. No. 9,065,699.

(51) Int. Cl.
*H04B 7/08* (2006.01)
*H04W 24/00* (2009.01)
(Continued)

(52) U.S. Cl.
CPC .......... *H04B 7/022* (2013.01); *H04B 1/0003* (2013.01); *H04B 7/0885* (2013.01); *H04L 27/06* (2013.01); *H04W 84/18* (2013.01); *H04W 88/16* (2013.01)

(58) Field of Classification Search
CPC .... H04L 27/06; H04L 27/3818; H04W 80/02; H04W 84/18; H04W 88/16;
(Continued)

(56) References Cited

U.S. PATENT DOCUMENTS 6,654,428 B1 11/2003 Bose et al.
6,845,240 B2 1/2005 Carlson et al.
(Continued)

FOREIGN PATENT DOCUMENTS

WO WO-2011/011118 1/2011

OTHER PUBLICATIONS

First Chinese Office Action on 201280078173.4 dated Apr. 12, 2016.
(Continued)

*Primary Examiner* — Ahmed Elallam
(74) *Attorney, Agent, or Firm* — Foley & Lardner LLP; Paul M. H. Pua

(57) ABSTRACT

The present disclosure is directed to methods and systems for providing a distributed radio communications network. Each of a first gateway and a second gateway may separately receive modulated signals comprising at least a portion of data from a first node of a plurality of geographically-dispersed nodes. The modulated signals may be wirelessly transmitted as radio frequency (RF) signals from the first node, the data gathered or generated by the first node at a first location. A server may receive the modulated signals from the first gateway and the second gateway. As configured by software-defined radio (SDR) software, the server may perform processing of the separately received modulated signals to recover the data. The processing may include demodulation of the modulated signals.

20 Claims, 13 Drawing Sheets

(51) Int. Cl.
*H04B 7/02* (2006.01)
*H04L 27/06* (2006.01)
*H04B 1/00* (2006.01)
*H04W 84/18* (2009.01)
*H04W 88/16* (2009.01)

(58) Field of Classification Search
CPC ... H04W 76/025; H04B 1/0003; H04B 7/022; H04B 7/0885
See application file for complete search history.

(56) References Cited

U.S. PATENT DOCUMENTS

| | | | |
|---|---|---|---|
| 7,119,676 | B1 | 10/2006 | Silverstrim et al. |
| 7,944,883 | B2 * | 5/2011 | Orth .................. H04L 12/66 370/330 |
| 9,065,699 | B2 * | 6/2015 | Stratigos, Jr. ........... H04L 27/06 |
| 2006/0158325 | A1 | 7/2006 | Cha et al. |
| 2006/0221913 | A1 | 10/2006 | Hermel et al. |
| 2006/0287001 | A1 | 12/2006 | Budampati et al. |
| 2007/0153677 | A1 | 7/2007 | McLaughlin et al. |
| 2007/0206616 | A1 | 9/2007 | Orth |
| 2009/0207735 | A1 | 8/2009 | Ben Letaief et al. |
| 2009/0243869 | A1 | 10/2009 | Sanderford, Jr. |
| 2010/0075611 | A1 | 3/2010 | Budampati et al. |
| 2011/0032896 | A1 | 2/2011 | Cubic et al. |
| 2011/0069611 | A1 | 3/2011 | Chung et al. |
| 2012/0011365 | A1 | 1/2012 | Schmidt et al. |
| 2012/0027068 | A1 | 2/2012 | Motoyoshi |
| 2012/0059903 | A1 | 3/2012 | Kim |
| 2012/0219039 | A1 | 8/2012 | Feher |
| 2012/0256789 | A1 | 10/2012 | Bull et al. |
| 2012/0263053 | A1 | 10/2012 | Li et al. |

OTHER PUBLICATIONS

Hiroyuki Shiba, Yo Yamaguchi, Kazunori Akabane, Takayuki Yamada, and Kazuhiro Uehara, A Flexible Wireless System for Supporting a Wide Variety of Wireless Systems, IEICE Technical Report, Japan, the Institute of Electronics, Information and Communication Engineers, Jul. 22, 2009, vol. 109, No. 155, pp. 7-12.
Japanese Notification of Reason for Refusal on 2015-545023 dated Jan. 5, 2016.
Mamoru Kobayashi, Nobuaki Mochizuki, Yuji Shirato, Shuichi Yoshino, Kazunori Akabane, and Kazuhiro Uehara, Proposal for User-Centric Wireless Home Networks, Proceedings of IEICE General Conference, Japan, Institute of Electronics, Japan, the Information and Communication Engineers, Mar. 6, 2012, p. 616.
Seiji Ohmori, Takafumi Fujita, Kiyohiko Itokawa, Daisei Uchida, and Shigeru Kuwano, A Study of Site Diversity for Wide Area Ubiquitous Network, Proceedings of IEICE Society Conference, Japan, the Institute of Electronics, Information and Communication Engineers, Aug. 30, 2011, p. 495.
International Search Report & Written Opinion on PCT/US2012/067744 dated Aug. 27, 2013.
Notice of Allowance in U.S. Appl. No. 13/690,602 dated Feb. 26, 2015.
Office Action in U.S. Appl. No. 13/690,602 dated Nov. 3, 2014.
Extended European Search Report on 12889105.8 dated Jun. 23, 2016.
Japanese Decision of Refusal on 2015-545023 dated May 17, 2016.

* cited by examiner

METHODS AND SYSTEMS FOR A DISTRIBUTED RADIO COMMUNICATIONS NETWORK

RELATED APPLICATION

This application is a continuation of and claims priority to U.S. patent application Ser. No. 13/690,602, titled "METHODS AND SYSTEMS FOR A DISTRIBUTED RADIO COMMUNICATIONS NETWORK" and filed on Nov. 30, 2012, the contents of which are hereby incorporated by reference in their entirety for all purposes.

FIELD OF THE DISCLOSURE

This disclosure generally relates to methods and systems for distributed collection of data. In particular, this disclosure relates to methods and systems for a distributed radio communications network.

BACKGROUND OF THE DISCLOSURE

Conventional data collection networks, such as wireless sensor networks (WSNs), provides distributed monitoring using sensor nodes which typically aim to be low-cost and/or low-power. The geographical range of such networks may be limited and certain networks may employ multi-hop transmission over a number of nodes, such as in a mesh configuration. Some data collection systems sometimes face network impairment due to disabled nodes and/or low signal-to-noise ratios. Certain conventional data collection networks also face increased costs due to the number of nodes deployed to support the network, specialized hardware to gather or process the data, and/or maintenance/upgrade of these remote nodes. In multiple industries including agriculture, weather prediction, disaster management and homeland security, real time collection of environmental data over wide areas is a key enabler. However, existing wireless technologies including mesh networks, cellular and satellite do not have the range or are cost prohibitive for pervasive monitoring applications.

SUMMARY OF THE DISCLOSURE

In various aspects, the present application is directed to methods and systems for a distributed radio communications network. Such a network may include a pervasive wireless sensor network or a machine to machine (M2M) network. Certain embodiments of a distributed radio communications network can be implemented using software defined radio (SDR). A SDR may implement functions normally provided by hardware (e.g. mixing, filtering, amplification, modulation/demodulation, detecting and coding) in software. Radio frequency (RF) signals may be converted to and from the digital domain via analog-to-digital (A/D) and digital-to-analog (D/A) converters. By employing a SDR, RF signals received by an antenna may be filtered and/or amplified prior to being sampled by an A/D converter. A processor executing software applications may process samples from the A/D converter and may reconstruct the transmitted information. The reverse process can take information that is to be transmitted and may construct samples of a transmitted waveform that is applied to a D/A converter. The output of the D/A converter may then be filtered and amplified before being applied to an antenna. Digital or analog frequency conversion steps may be utilized to convert samples to or from the desired operating frequency. In some radio communications applications, it may be desirable to perform some or all of the receiver functions at a location which is far removed from the antenna and RF electronics. This could occur when the complexity of some receiving functions require costly processing systems (for example MIMO/MISO/SIMO applications). Rather than perform these functions at the receiver, it may be advantageous to collect the samples of RF information and send them via a network to a central location, such as where SDR processing functions may be located, and/or can be shared among multiple radios/antennas.

In some aspects, and as disclosed herein, certain SDR features may be centralized at, or selectively-assigned to, and/or delegated to particular devices operating in a distributed radio communications network. In certain embodiments, updates to particular SDR functions may be directed to a central device (or devices) hosting the SDR functions, instead of being distributed to disparate locations via a network. Such updates may be transmitted through the network, and in some cases wirelessly. Such SDR configurations may allow for more manageable maintenance and update, for example, as compared to dedicated hardware or installation of full-featured SDRs at every node. The present disclosure also describes systems and methods which address impairments such as doppler and multipath associated with ionospheric propagation, and may improve communication link margin by combining data received at multiple locations.

In one aspect, the present disclosure describes a system for providing a distributed radio communications network to implement a wireless sensor network (WSN) where sensor nodes may comprise low cost transmitting and receiving electronics and small, inefficient antennas. Nodes may be equipped with various sensors that measure some aspect of the environment such as temperature, humidity or other weather conditions, water quantity or quality in a river or stream for example, or characteristics of soil or other geological components such as temperature, moisture content, salinity or other parameters. The distributed radio communications network as described can receive node transmissions by employing multiple antennas in a cooperative fashion, from nodes whose transmissions might otherwise be undetectable by a single antenna and single receiver. In a similar manner, transmissions may be sent from the network to a node using very low power signals from multiple gateway antennas while using low power transmissions from any one gateway antenna. In another aspect, the present disclosure describes a method of a distributed radio communications network where node transmissions utilize frequencies below 30 MHz where both ground wave and ionospheric propagation can occur. Ionospheric propagation may involve near vertical incidence (NVIS) skywave or long path skywave modes. By employing a network of distributed antennas, node transmissions may occur and may be received over one or multiple nodes simultaneously due to the distributed nature of the gateway antennas which may be located at various distances from a transmitting node that facilitates a particular propagation mode.

In yet another aspect, the present disclosure is directed to a method for providing a distributed radio communications network. The method may include receiving, by each of a first gateway and a second gateway separately, modulated signals comprising at least a portion of data from a first node of a plurality of geographically-dispersed nodes. The modulated signals may be wirelessly transmitted as radio frequency (RF) signals from the first node, the data gathered or generated by the first node at a first location. A server may receive the modulated signals from the first gateway and the second gateway. As configured by software-defined radio (SDR) software, the server may perform processing of the separately received modulated signals to recover the data. The processing may include demodulation of the modulated signals.

In certain embodiments, the first gateway may compress the modulated signals received by the first gateway, and may communicate the compressed modulated signals to the server. The server may perform processing that includes at least one of single input multiple output (SIMO) and multiple input multiple output (MIMO) processing. The server may perform processing that includes at least one of: signal filtering, interference rejection, decompression, encryption, decryption, forward error correction (FEC), coding, decoding, beamforming and antenna diversity processing. In some embodiments, the first gateway, the second gateway and the server are connected via a communications network.

In some embodiments, at least one of the first gateway and the second gateway may receive one of the RF signals reflected off of the ionosphere. The first gateway and the second gateway may receive the modulated signals as RF signals transmitted via at least two of: a direct path from the first node, a ground wave path, and ionospheric reflection. The first node may transmit a low-power, RF signal between 3 and 30 megahertz (MHz), over a transmission path of more than 10 kilometers to at least one of the first gateway and the second gateway. The server may time-synchronize the modulated signals separately received from the first gateway and the second gateway for combination of the modulated signals. The server may identify and may remove interfering signals from the modulated signals received from the first gateway and the second gateway.

In still another aspect, the present disclosure is directed to a system for providing a distributed radio communications network. The system may include a first node of a plurality of geographically-dispersed nodes. The first node may gather or generate data at a first location. A first gateway and a second gateway may separately receive modulated signals comprising at least a portion of the data from the first node. The modulated signals may be wirelessly transmitted as radio frequency (RF) signals from the first node. In certain embodiments, a server may receive the modulated signals from the first gateway and the second gateway. The server may be configured by software-defined radio (SDR) software to perform processing of the separately received modulated signals to recover the data. The processing may include demodulation of the modulated signals.

In some embodiments, the first gateway compresses modulated signals received by the first gateway, and may communicate the compressed modulated signals to the server. The server may be configured by the SDR software to perform processing comprising at least one of single input multiple output (SIMO) and multiple input multiple output (MIMO) processing. In certain embodiments, the first gateway, the second gateway and the server are connected by a communications network. At least one of the first gateway and the second gateway may receive one of the RF signals reflected off of the ionosphere. The first gateway and the second gateway may receive the modulated signals as RF signals transmitted via at least two of: a direct path from the first node, a ground wave path, and ionospheric reflection.

In certain embodiments, the first node transmits a low-power, RF signal between 3 and 30 megahertz (MHz or mega-Hertz), over a transmission path of more than 10 kilometers to at least one of the first gateway and the second gateway. The server may perform processing of the modulated signals comprising at least one of: signal filtering, interference rejection, decompression, encryption, decryption, forward error correction (FEC), coding, decoding, beamforming and antenna diversity processing. The server may time-synchronize the modulated signals separately received from the first gateway and the second gateway for combination of the modulated signals. In some embodiments, the server identifies and removes interfering signals from the modulated signals received from the first gateway and the second gateway.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein; and Section B describes embodiments of methods and apparatuses for a distributed radio communications network.

A. Computing and Network Environment

Figure 1A:
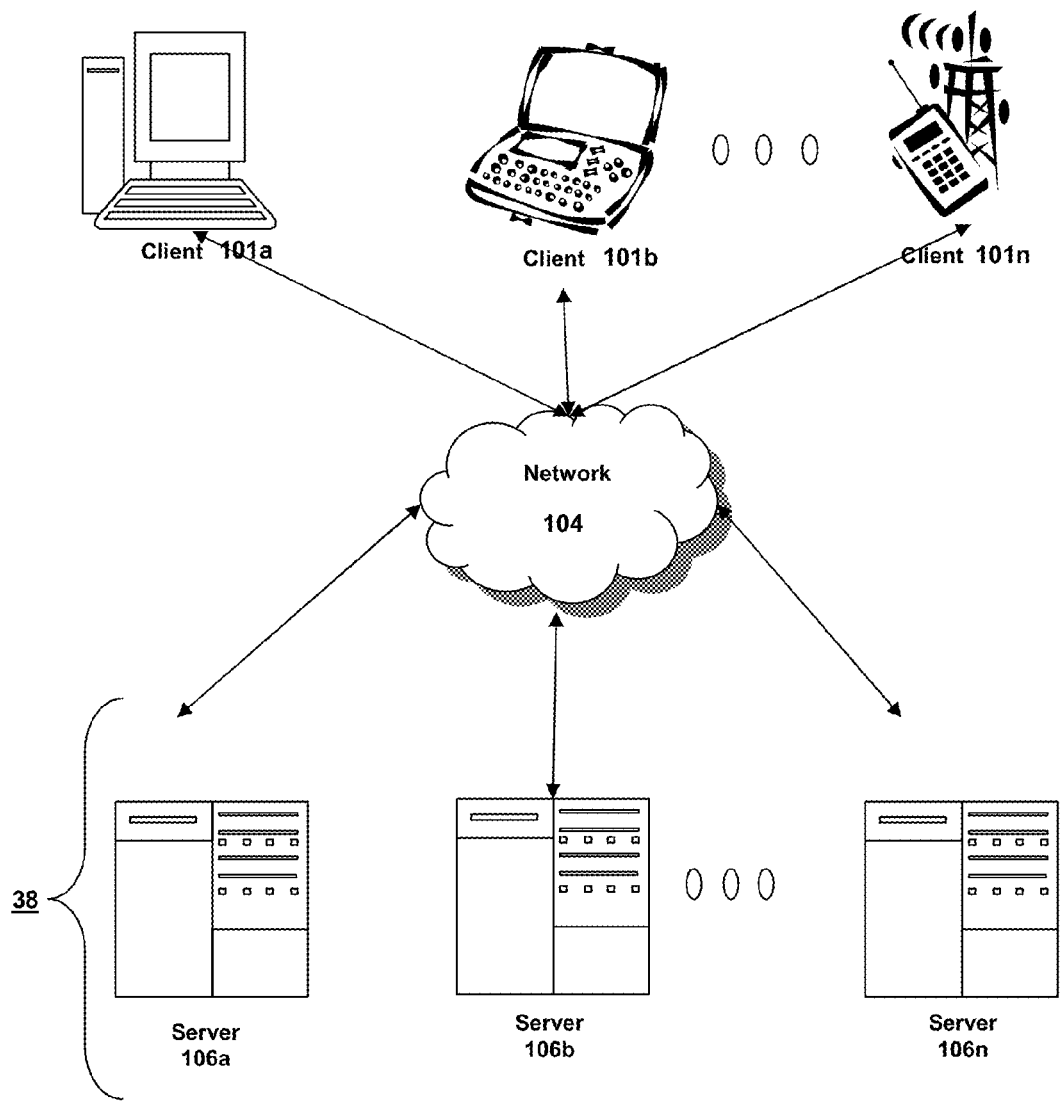
FIG. 1A is a block diagram depicting an embodiment of a network environment comprising client machines in communication with remote machines.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 101a-101n (also generally referred to as local machine(s) 101, client(s) 101, client node(s) 101, client machine(s) 101, client computer(s) 101, client device(s) 101, endpoint(s) 101, or endpoint node(s) 101) in communication with one or more servers 106a-106n (also generally referred to as server(s) 106, node 106, or remote machine(s) 106) via one or more networks 104. In some embodiments, a client 101 has the capacity to function as both a client node seeking access to resources provided by a server and as a server providing access to hosted resources for other clients 101a-101n.

Although FIG. 1A shows a network 104 between the clients 101 and the servers 106, the clients 101 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 101 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol(s) or standard(s) used to communicate among mobile devices, including AMPS, TDMA, CDMA, GSM, GPRS, UMTS, WiMAX, 3G or 4G. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems, Inc.; the VirtualServer or virtual PC hypervisors provided by Microsoft or others.

In order to manage a machine farm 38, at least one aspect of the performance of servers 106 in the machine farm 38 should be monitored. Typically, the load placed on each server 106 or the status of sessions running on each server 106 is monitored. In some embodiments, a centralized service may provide management for machine farm 38. The centralized service may gather and store information about a plurality of servers 106, respond to requests for access to resources hosted by servers 106, and enable the establishment of connections between client machines 101 and servers 106.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

In one embodiment, the server 106 provides the functionality of a web server. In another embodiment, the server 106a receives requests from the client 101, forwards the requests to a second server 206b and responds to the request by the client 101 with a response to the request from the server 106b. In still another embodiment, the server 106 acquires an enumeration of applications available to the client 101 and address information associated with a server 106' hosting an application identified by the enumeration of applications. In yet another embodiment, the server 106 presents the response to the request to the client 101 using a web interface. In one embodiment, the client 101 communicates directly with the server 106 to access the identified application. In another embodiment, the client 101 receives output data, such as display data, generated by an execution of the identified application on the server 106.

Figure 1B:
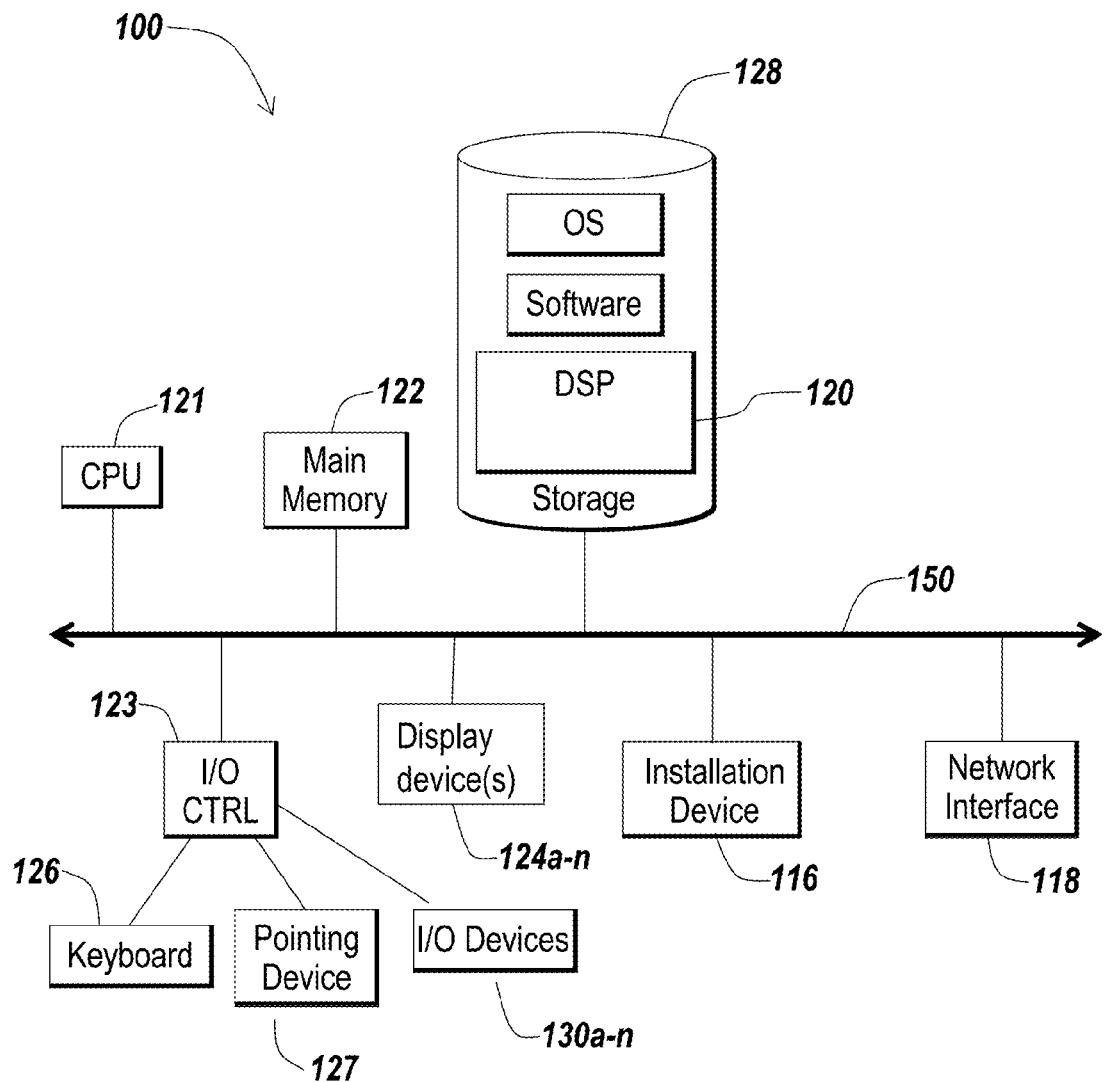
FIGS. 1B and 1C are block diagrams depicting embodiments of computing devices useful in connection with the methods and systems described herein.
Figure 1C:
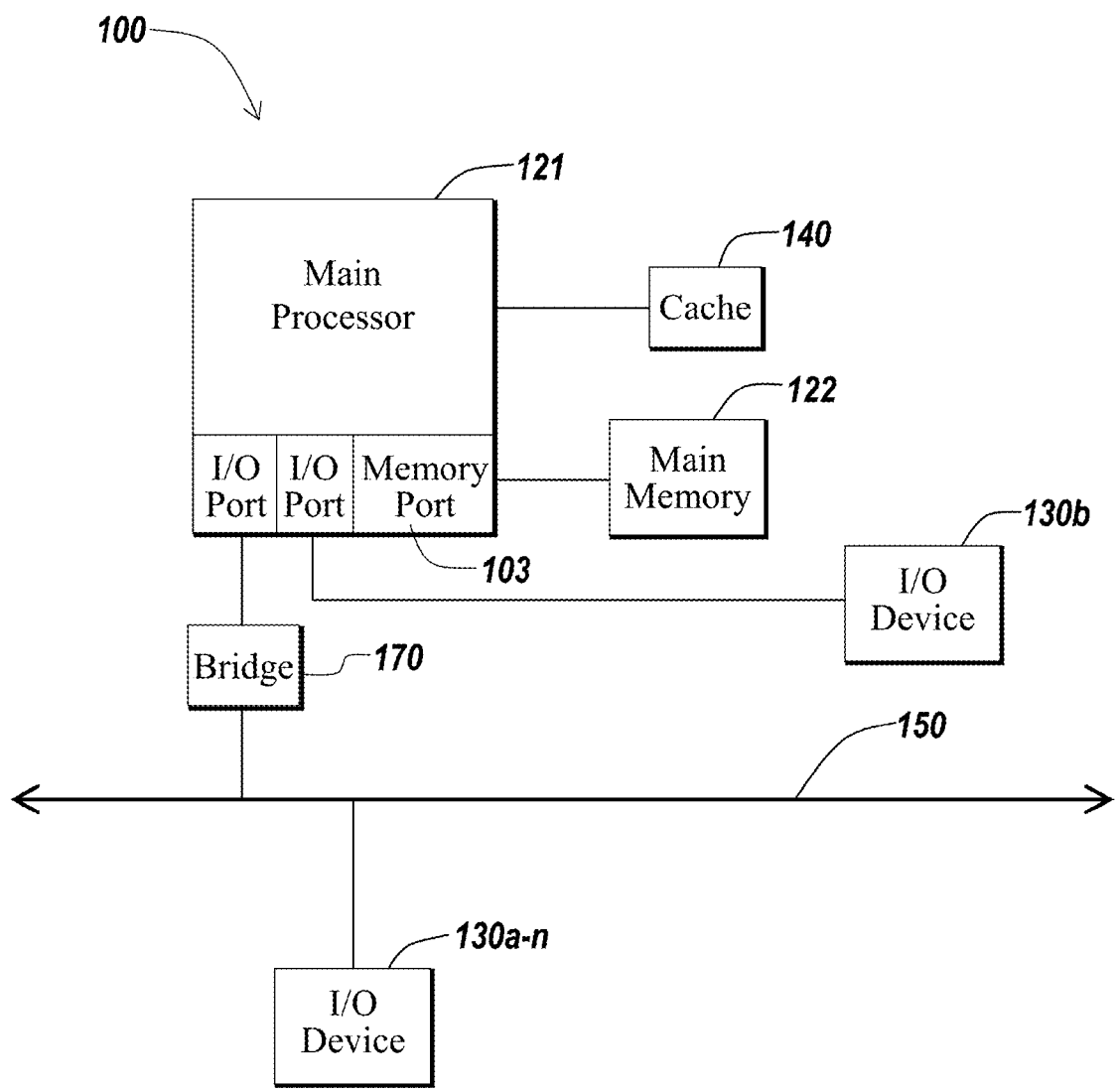

The client 101 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 101 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-101n, a keyboard 126 and a pointing device 127, such as a mouse. The storage device 128 may include, without limitation, an operating system, software, and a software of a demand side platform 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), NAND Flash, NOR Flash and Solid State Drives (SSD). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 may communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, touch pads, and drawing tablets. Output devices include video displays, speakers, inkjet printers, laser printers, projectors and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a disk drive, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the software 120 for the demand side platform. Optionally, any of the installation devices 116 could also be used as the storage device. Additionally, the operating system and the software can be run from a bootable medium, for example, a bootable CD.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, manufactured by Google Inc; WINDOWS 7 and 8, manufactured by Microsoft Corporation of Redmond, Wash.; MAC OS, manufactured by Apple Computer of Cupertino, Calif.; WebOS, manufactured by Research In Motion (RIM); OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPAD or IPOD family of devices manufactured by Apple Computer of Cupertino, Calif., a device of the PLAYSTATION family of devices manufactured by the Sony Corporation of Tokyo, Japan, a device of the NINTENDO/Wii family of devices manufactured by Nintendo Co., Ltd., of Kyoto, Japan, or an XBOX device manufactured by the Microsoft Corporation of Redmond, Wash.

In some embodiments, the computing device 100 may have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry handheld or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a tablet such as the Apple IPAD, or a digital audio player such as the Apple IPOD lines of devices, manufactured by Apple Computer of Cupertino, Calif. In another of these embodiments, the digital audio player may function as both a portable media player and as a mass storage device. In other embodiments, the computing device 100 is a digital audio player such as an MP3 players. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the communications device 101 includes a combination of devices, such as a mobile phone combined with a digital audio player or portable media player. In one of these embodiments, the communications device 101 is a smartphone, for example, an iPhone manufactured by Apple Computer, or a Blackberry device, manufactured by Research In Motion Limited. In yet another embodiment, the communications device 101 is a laptop or desktop computer equipped with a web browser and a microphone and speaker system, such as a telephony headset. In these embodiments, the communications devices 101 are web-enabled and can receive and initiate phone calls.

In some embodiments, the status of one or more machines 101, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Distributed Radio Communications Network

Prior to discussing specific embodiments of the present solutions, it may be helpful to describe aspects of software defined radios (SDRs) in connection with the methods and systems described herein. A SDR can implement functions normally provided by radio hardware (e.g. mixing, filtering, amplification, modulation/demodulation, detecting, decoding, encoding) in software. By way of example, SDR software may perform radio frequency filtering, audio frequency filtering and/or signal enhancement (e.g., equalization and binaural presentation). In a SDR, some amount of signal processing may be performed by a general-purpose processor for example, instead of specialized hardware. Various functions can therefore be implemented via software configuration on a computing device, such as those described in connection with FIGS. 1A-1C.

Hardware that may be configured by SDR includes embedded systems and systems incorporating field programmable gate array (FPGA) devices, as examples. In certain applications and implementations, some components or functions of a SDR device disclosed herein may remain in hardware, for example, an analog-to-digital converter. SDR software as disclosed herein may be special-purpose and/or configurable. Thus, SDRs may be configured to be capable of receiving and transmitting various radio or communications protocols. Software implementing modules of a SDR Server 107 may be written in a variety of computer language, such as C, assembly language, Python, Java, Basic, or other languages.

Radio frequency (RF) signals may be converted to and from the digital domain via analog-to-digital (A/D) and digital-to-analog (D/A) converters. In a SDR, RF signals received by an antenna may be filtered and amplified (e.g., by one or more software-defined hardware components) prior to being sampled by an A/D converter (e.g., one or more software-defined hardware components). A processor executing software applications may process samples from the A/D converter and may reconstruct the transmitted information. The reverse process may take information that is to be transmitted and may construct samples of a transmitted waveform that is applied to a D/A converter (e.g., implemented as one or more software-defined hardware components). The output of the D/A converter can then be filtered and/or amplified (e.g., by one or more software-defined hardware components) before being applied to an antenna. Digital or analog frequency conversion steps may be utilized to convert samples to or from the desired operating frequency (e.g., within one or more software-defined hardware components).

In a distributed radio communications network configuration, such as those disclosed herein in connection with the present methods and systems, SDR software and/or associated applications may be deployed on one or more network devices. The distributed radio communications network may include a wide-area or pervasive wireless sensor network (WSN) or machine to machine (M2M) network. Such networks may be configured to monitor and/or provide information about water, weather and/or energy to customers in agriculture, government and defense. Such a network may channel generated data to a centralized node for processing and/or combination. In certain embodiments, the network may include a cloud-based sensor network (hereafter sometimes referred as "RadioCloud") to gather or receive data from low-cost, battery-powered sensors. A network of gateways may be deployed (e.g., as part of the RadioCloud) to relay sensor transmissions to a processing center or cloud-based applications. The transmissions may be relayed via IP networks for example, that may be wireless or otherwise. A cloud-based web services platform may provide end-user access to data recovered from the sensor transmissions.

In some embodiments, a significant portion of a distributed radio communications network can be implemented using SDRs. For example, some sensors or gateways, or components thereof, may be implemented using specifically-adapted SDR software and applications. Conventional SDRs typically combine the front-end, digital conversion and software functions into a single device, which requires that all devices in a network be equipped with the necessary hardware and software functions along with a power supply to power all the components. The SDR solutions disclosed herein may configure specific devices (e.g., a central server), and may provide specific functions but not require all.

In certain embodiments, the distributed radio communications network is configured to collect network-wide data on impairments such as interference, to a central location for example. The distributed radio communications network may improve communication link margin by combining data received at multiple locations (e.g., gateways). In a network, updates to SDR functions may require physical dissemination of computer media (e.g., a CDROM) or may require multiple downloads of files over a communications network. Embodiments of the distributed radio communications network employing SDR may defer or relocate computationally intensive techniques such as antenna diversity or Multiple-Input Multiple-Output (MIMO), Multiple-Input Single-Output (MISO) or Single-Input Multiple Output (SIMO) from some or all radios (e.g., a sensor or gateway) in the network, to a central processing node or to specific applications hosted at one or more locations in the network. It is therefore not necessary for all radios in the network to contain computational hardware and complete software functions for handling these computationally-intensive techniques.

In some radio communication applications, it may be desirable to perform some of the receiver functions at a particular location that is far removed from the antenna and/or RF electronics. This could occur when the complexity of some receiving functions require costly processing systems (for example, MIMO/MISO/SIMO applications). Rather than perform these functions at each receiver (e.g., a gateway or intermediate node), it may be advantageous to collect the samples of RF information and send them via a network to a remote location where SDR processing can be centralized or shared among multiple radios.

Figure 2A:
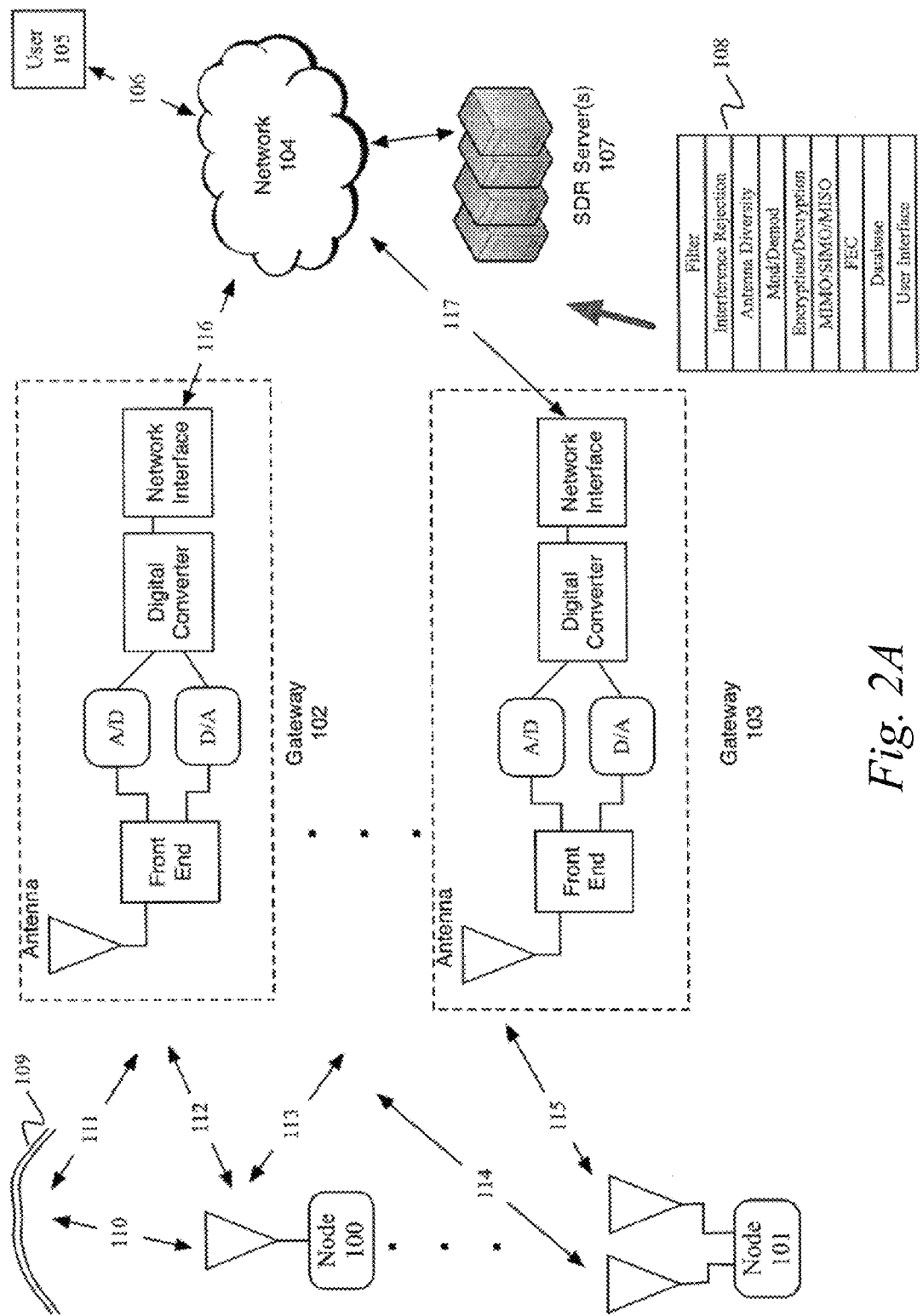
FIG. 2A is a block diagram illustrating an embodiment of a distributed radio communications network.

By way of illustration, FIG. 2A shows an embodiment of a distributed radio communications network having a plurality of nodes (100, 101) and a plurality of gateways (102, 103). The nodes 100, 101 may communicate over one or more radio channels with one or more gateways (102, 103). Each gateway (102, 103) may be connected over a respective wired or wireless communications link 116, 117 via a network 104 to one or more SDR servers 107.

Each gateway may include an antenna, a "front end module", an A/D converter, a D/A converter, a digital upconverter, a digital downconverter, and a network interface. One or more software modules, applications, or other executable code running on the SDR servers 107 may operate on digital samples received from the gateways (102, 103), or generate samples that are in turn transmitted by the gateways (102, 103) to the nodes. At least one, and possibly a plurality of users (105, 106) may be connected to the network 104. Users may access modules on the SDR server 107 to view, generate and/or retrieve information from nodes (100, 101). Users 105 can access data transmitted by the nodes 100, 101. By way of a non-limiting example, the nodes 100, 101 can be wireless sensors that measure some parameter from the environment (e.g., water level, temperature, humidity, pressure, infrared levels to detect fires, location, radioactivity, sound levels, geological activity, etc). The network may collect such data and may provide some or all of the data to users 105 via web pages, maps, application interfaces, broadcasts, etc. Users 105 may also interact with the modules 108 and nodes 100, 101, e.g., by setting an alarm level (e.g., for water temperature) that would cause an alert if a threshold value is exceeded. A node 100, 101 can be any device that transmits and/or receives information over a network, such as conventional sensors used in WSN, or custom-built and/or configured sensor nodes. Certain embodiments of the RadioCloud system may include transmit-only nodes that send data, while other embodiments may include nodes that send data as well as receive communications, which may include instructions, updates, configurations, and data for retransmission.

Still referring to FIG. 2A, nodes 100 and 101 may include hardware radios and/or software defined radios. These nodes can send and receive information over a radio frequency (RF) channel. Nodes may be equipped with a single (100) or a plurality of (101) antennas. Transmissions 112 to and from a node 100 may propagate or travel directly to a gateway (102, 103), such as via ground wave propagation, or be reflected 110, 111 from the Earth's ionosphere 109, to form a high frequency (HF) radio network. In ground or surface wave propagation, radio waves may travel near Earth's surface without being reflected or refracted by the atmosphere. With ground wave propagation, HF signals may be strongly diffracted and follow the curvature of the Earth up to distances of a few tens of kilometers depending on frequency. Such ground wave propagation may include a dominant propagation mode at lower frequencies. A node may also send data using line-of-sight propagation, in which radio waves travel in a straight line, and have a dominant mode at higher frequencies.

In some aspects, a node may transmit data to one or more gateways via skywave. Skywave propagation may occur at shortwave radio frequencies, including the upper medium frequency (MF) and all of the high frequency (HF) portion of the radio spectrum. Skywave propagation leverages on the propagation of radio waves reflected or refracted back toward Earth from the ionosphere. Due to the nature of the earth's ionosphere, signals in the HF range may be reflected and can travel large distances. Skywave propagation can be used to relay data to receivers beyond the horizon, despite the curvature of the Earth, up to intercontinental ranges. Skywave propagation occurs when signals are reflected off of the ionosphere at either high (NVIS) or low (long path) incidence angles. In particular, long path propagation with a single low angle reflection can provide transmission paths of thousands of kilometers.

In certain aspects, a node may transmit data to one or more gateways via Near Vertical Incidence Skywave (NVIS), which may support transmission ranges between that of ground wave and skywave distances (e.g., about 50 to 650 km). NVIS radio waves may use frequencies between 1.8 MHz and 15 MHz. NVIS operation may include the selection of an operating frequency that can reflect off of the ionosphere, which undergoes diurnal variations due the ionizing effects of solar radiation. Some advantages of NVIS are that the corresponding RF path loss is quite low, allowing the use of low power transmitters, and that propagation beyond the NVIS zone is greatly attenuated resulting in a potential for frequency reuse. With nodes transmitting via NVIS, radio waves may travel upwards into the ionosphere, where they may be refracted back down and received within a region up to 650 km from the transmitter.

Ionospheric propagation can inflict multiple impairments on a RF signal, including doppler delay spread, multipath resulting from time variations in propagation, interference from natural sources such as lightning, and interference from transmitters that share the same or nearby spectrum in other regions of the world. The present systems and methods can address impairments such as doppler and multipath associated with ionospheric reflections and interference, and may improve communication link margin by combining data received at multiple locations.

Utilizing the HF spectrum for WSNs includes a number of challenges including diurnal variations in the Earth's ionosphere, natural and man-made noise and interference from transmitter that share the same frequencies in other regions of the world. The RadioCloud system takes advantage of HF propagation and low free space loss while overcoming such challenges. By using SDR technology and power efficient modulation, both HF propagation modes can be used to optimize a WSN for applications such as soil moisture monitoring and broader environmental data monitoring where infrequent reports with small amounts of data are needed with large geographic coverage. Moreover, the RadioCloud system is designed to exploit surface and NVIS propagation modes, and proposed locations of nodes and gateways can be used to determine the relative performance of each mode.

By supporting signal propagation at high frequencies (e.g., 3-30 MHz), using low power and at propagation ranges beyond 10 km, the present systems and methods differ from and offer advantages over those of conventional WSN such as mesh networks. Mesh networks, for example, rely on short range (typically less than 300 m) signals relayed from a source node through other nodes over multiple hops to reach a destination device. Intermediate nodes perform demodulation of received signals, and modulation prior to retransmission. Such additional processing results in increased complexity and cost of each network node. In applications such as remote monitoring of soil moisture in large scale farming operations, cost, battery requirements and limited coverage of cellular service make cellular data networks unsuitable for environmental monitoring. Satellite networks are even more costly to operate (typically more than $15/month/node) than cellular, require larger antennas and have line of sight limitations that preclude use with tall crops or foliage.

To reduce power requirements, the present systems and methods may leverage on lower data rates (e.g., 100 bps) requirements of certain applications. Bandwidth efficient waveforms (e.g., phase-shift keying (PSK)) may be used where higher link data rate for a given bandwidth is required. Power efficient waveforms (e.g., PSK, M-PSK) may trade off bandwidth efficiency to reduce the transmit power needed in power-constrained applications such as battery-powered WSNs.

Transmissions 114, 115 from a node 101 may utilize multiple antennas to provide MIMO or MISO capabilities within the network. In some cases, the nodes (e.g., transmit only nodes) may employ a media access control (MAC) protocol or some other protocol to schedule their transmissions. A transmission may be scheduled at a specific time and/or frequency to minimize the potential for collisions with the transmissions of other nodes, e.g., using time and/or frequency division multiplexing. For example, GPS coordinates or other node identifier(s) might be used to select or identify a specific time and/or frequency slot for a respective transmission.

In certain embodiments, a gateway (102, 103) may include a transceiver, an antenna, one or more front end components for converting and amplifying RF signals, A/D and D/A converters, a digital converter circuit and/or a network interface. The gateway may include a SDR transceiver or a SDR interface. Each of the gateways may be configured to receive different types/modes of transmissions from one or more of the nodes. For example, a gateway may be configured to receive signals from any one or more of the three modes (ground wave, NVIS and long skywave). The gateway may perform direct sampling on signals received at the gateway. The gateway may down-convert (e.g., via a digital down-converter) received signals without demodulating the signals. The gateway may sample the down-converted signals, and may transmit these samples via a network (such as the Internet) to a remote/central location for processing.

The gateway can sample the received signals on a designated time, e.g., as instructed by software of a SDR server. A network interface of the gateway may relay samples of the RF spectrum to and from the network 104. The network may comprise a private packet switched network, a public network, the Internet, or any another wide area or local area network. The network interface may comprise an Ethernet or other interface. The network interface may enable radio processing modules to be remoted anywhere on a network without limiting these within the gateway or a device proximately-connected to the gateway. In certain embodiments, the radio processing modules are configured via SDR on a computing device (e.g., a SDR server) connected to the gateway (e.g., via USB). The gateway may compress the samples prior to relaying the compressed sampled to a central SDR server.

In certain embodiments, the gateway software down-converts the received signals to baseband so as to reduce the bandwidth required to send signal samples to the SDR server for further processing. The nodes and gateways may be synchronized according to GPS information (e.g., embedded in the received signals) so that received signals are appropriately grouped or separated, and the samples are properly time aligned. Signal transmissions from the nodes may include timing, synchronization and/or sequencing information embedded in the payload and/or header portion(s) of the signals. In certain embodiments, the nodes and gateways may receive and/or use information from GPS sources for high precision time synchronization. In certain embodiments, the RadioCloud system may use GPS time synchronization to recover symbol timing and for supporting multiple access. Some or all of these processing steps, which may be computationally-intensive, may be deferred from the gateway to the SDR server. The cost of gateways may be reduced since such gateways do not demodulate and/or significantly process the received node transmissions.

In certain embodiments, a network can comprise a plurality of nodes, gateways and/or users. A network 104 may be connected to one or multiple SDR servers 107 as in a cloud computing network. Modules 108 running on the SDR server(s) may perform various functions for recovering node data from the samples sent by the gateways 102, 103 over the network 104. In a like manner, these modules 108 may also generate samples containing information to be sent to the one or more nodes. Antennas on a gateway could be selected and/or configured to give a preference for one type of propagation or another (e.g., antennas having a high angle radiation pattern which may give preference to NVIS propagation)

SDR servers 107 may comprise any type of computing device configured via SDR software. Through configuration, a SDR server may include one or more modules that perform specific processing of samples of radio signals. Modules on the SDR server(s) 107 may include, but are not limited to, logic and functionality to perform filtering, interference rejection, modulation/demodulation, encryption/decryption, forward error correction (FEC) coding/decoding, MIMO/MISO/SIMO processing, beamforming and antenna diversity processing (e.g., maximum likelihood combining and diversity coding), database access and user interface. In one embodiment, all of the modules 108 may reside on a single SDR server 107. However, in alternative embodiments, fewer than all of the modules 108 may reside on each of a number of SDR servers 107. A user 105 may access recovered node data through a User Interface via the network 104.

In some aspects, MIMO processing involves the use of multiple antennas at both the transmitter and receiver to improve communication performance, by effectively providing multiple channels for communication. MIMO offers significant increases in data throughput and link range without additional bandwidth or increased transmit power, e.g., by spreading the same total transmit power over the antennas to achieve an array gain that improves the spectral efficiency or to achieve a diversity gain that improves the link reliability (reduced fading). SIMO similarly improves communication performance by offering multiple receiving antennas that can provide a diversity gain.

Beamforming is used in sensor arrays for directional signal transmission or reception, to achieve spatial selectivity. This is achieved by combining elements in a phased array in such a way that signals at particular angles experience constructive interference while others experience destructive interference. In some embodiments, beamforming as implemented in the RadioCloud system may be referred to as distributed beamforming. The RadioCloud system may include a number of (gateway) antennas separated by large distances to collect phase and amplitude information on the node signals. The RadioCloud system may use this information in the SDR server to form virtual 'beams' that selectively enhance signals coming from one direction and reduce signals coming from other directions. In effect, this collection of gateway antennas operates like one big steerable high gain antenna.

Antenna diversity uses two or more antennas to improve the quality and reliability of a wireless link. Often, there is no clear line-of-sight between transmitter and receiver, and a signal may be reflected along multiple paths before finally being received. Each of these bounces can introduce phase shifts, time delays, attenuations, and distortions that can destructively interfere with one another at the aperture of the receiving antenna. Antenna diversity mitigates these multipath situations because multiple antennas offer several observations of the same signal, experiencing a different interference environment. Thus, if one antenna is experiencing a deep fade, it is likely that another has a sufficient signal. Collectively such a system can provide a robust link.

Still referring to FIG. 2A, node 100 and node 101 may include commercial, standard or specifically-configured digital radios operating on HF, VHF, UHF or other frequencies. In certain embodiments, radios operating within the high frequency (HF) range, comprising spectrum from 3-30 MHz, are employed for RadioCloud. HF signals may be reflected by the various layers of the earth's ionosphere and can travel long distances. The HF spectrum had been widely used for a variety of services such as short wave broadcasting, marine and aeronautical communications and other commercial and defense communications; today, most of this spectrum is unused (e.g., with the exception of shortwave broadcasting, amateur radio and defense). In addition to underutilization and availability of this spectrum, HF transmissions can be desirable for outdoor wireless sensors because low power HF signals can travel long distances.

A node may be configured to transmit on one or more frequencies based on the location of, or distance from a receiving gateway. A node may be configured to transmit on one or more frequencies based on factors such as terrain, time of day, season, weather, supported propagation modes, etc. A node may transmit on a frequency that maximizes the chance of successful transmission to a receiving gateway. The propagation characteristics of the ionosphere may change due to the effects of solar radiation. This may mean that the maximum usable frequency or range increases at night. In a simple case, certain embodiments of a node may switch between two frequencies or frequency ranges during the day and night. A single transmission may travel by ground wave, or one or both skywave modes, depending on the location of a gateway that is receiving the signal.

The RadioCloud nodes may include wireless nodes each comprising one or more sensors. These nodes may include a radio capable of sending and/or receiving digital information as radio frequency signals or samples. The gateways 102 or 103 may be constructed from commercial, custom or specifically-programmed radio components such as antennas, RF converters, amplifiers, A/D and D/A converters, FPGAs, microprocessors and/or SDR components. The SDR server(s) 107 may comprise computing devices, for example, but not limited to standard computer servers running Microsoft Windows or the Linux operating system. The SDR server(s) may be dedicated to a defined application/task, and may comprise a cloud computing service which may utilize one or more virtual servers.

In some embodiments, and referring again to FIG. 2A, a node 100 sends a transmission 112, 113 that is received at gateway 102 and/or gateway 103. Samples of the received signal may be sent or directed to an antenna diversity module on a SDR server, where they may be time synchronized and combined, e.g., to improve signal to noise ratio (SNR) and/or other parameters. Alternatively, node 100 and node 101 may each send a space-time coded signal that is received by gateway 102 and/or gateway 103, which may each send samples to a MIMO/SIMO module to improve signal transmission speed/throughput, SNR, or other parameter of the received signal. The MIMO/SIMO processing may be performed entirely in software (e.g., via SDR software configuration, instead of custom radio hardware).

The configuration of one or more gateways may include a set of distributed antennas. These distributed antennas may collect disparate signals from multiple paths or propagation modes from one or more locations for aggregation/processing at a predefined central location. The distributed antennas may be configured to support antenna-diversity and/or beamforming strategies. In some embodiments, gateway 102 and/or gateway 103 may transmit space-time coded signals 114 and 115 to node 101 such that the speed/throughput, SNR, or other parameters of the link may be improved.

Figure 2B:
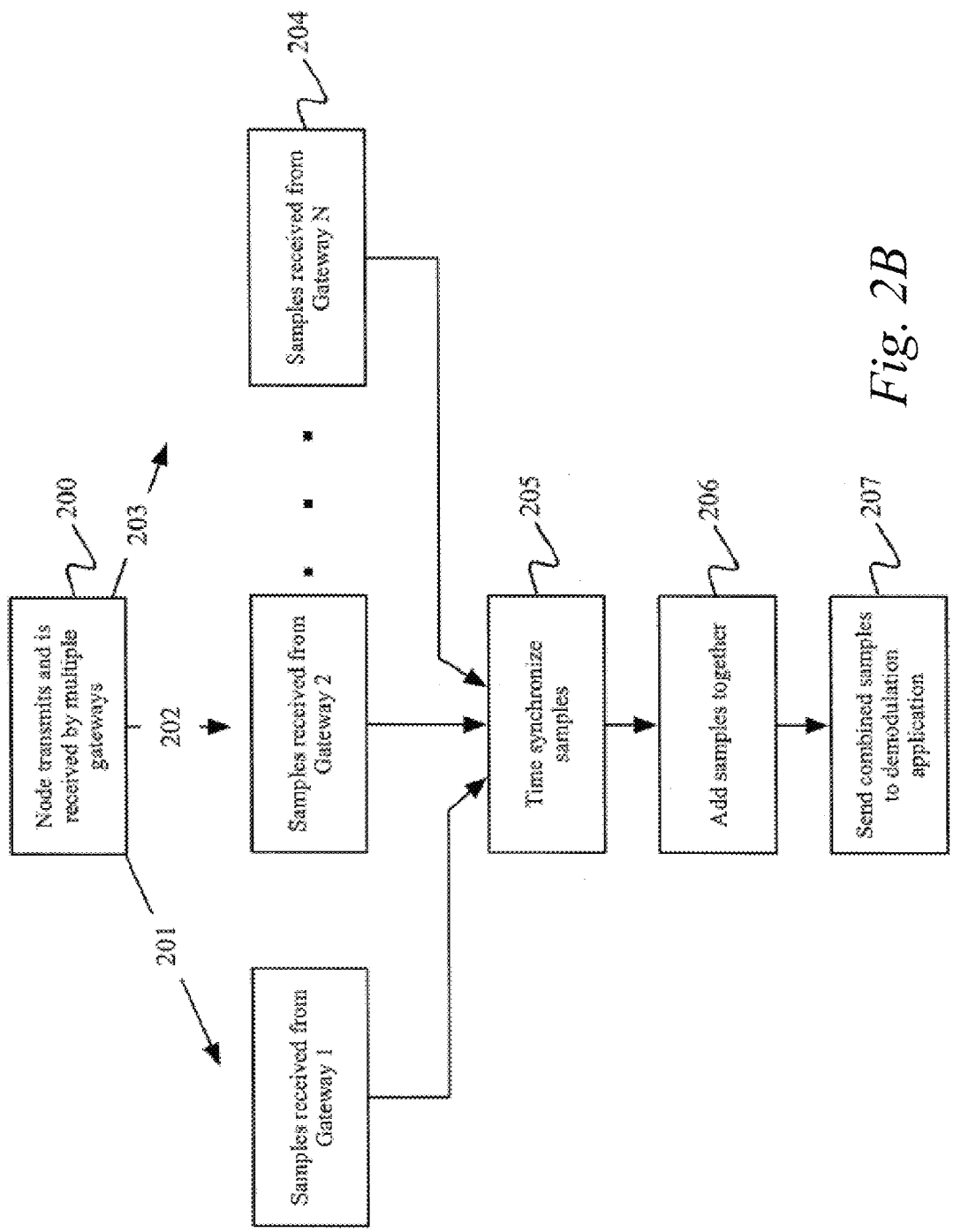
FIG. 2B is a flowchart illustrating an example of some steps that are applied to combine signals from multiple gateways.

FIG. 2B is a flow chart showing an example of steps that can be used to implement an antenna diversity module, such as that shown in FIG. 2A. In step 200, a node transmits a radio frequency signal that is received by multiple gateways via three paths 201, 202 and 203, or any other number of transmission paths. These paths may be direct from the node to the gateway, via a ground wave path, via a reflection off of the ionosphere, and/or via another type of path. Signals from these paths may be down-converted, e.g., to a baseband frequency, and sampled at each of the gateways. The samples may be time synchronized in step 205, for example using local GPS information or other timing information. The samples may be added together or otherwise combined in step 206 (e.g., despite being based on signals received over a distributed set of antennas/gateways), and then the combined samples may be sent to the demodulation module in step 207 where they are processed as if the samples came from a single path. Thus, demodulation and other processing techniques (e.g., SIMO/MIMO) can be performed as if it was a non-distributed system. The resulting signal to noise ratio may be improved as a consequence of the sample addition.

Figure 2C:
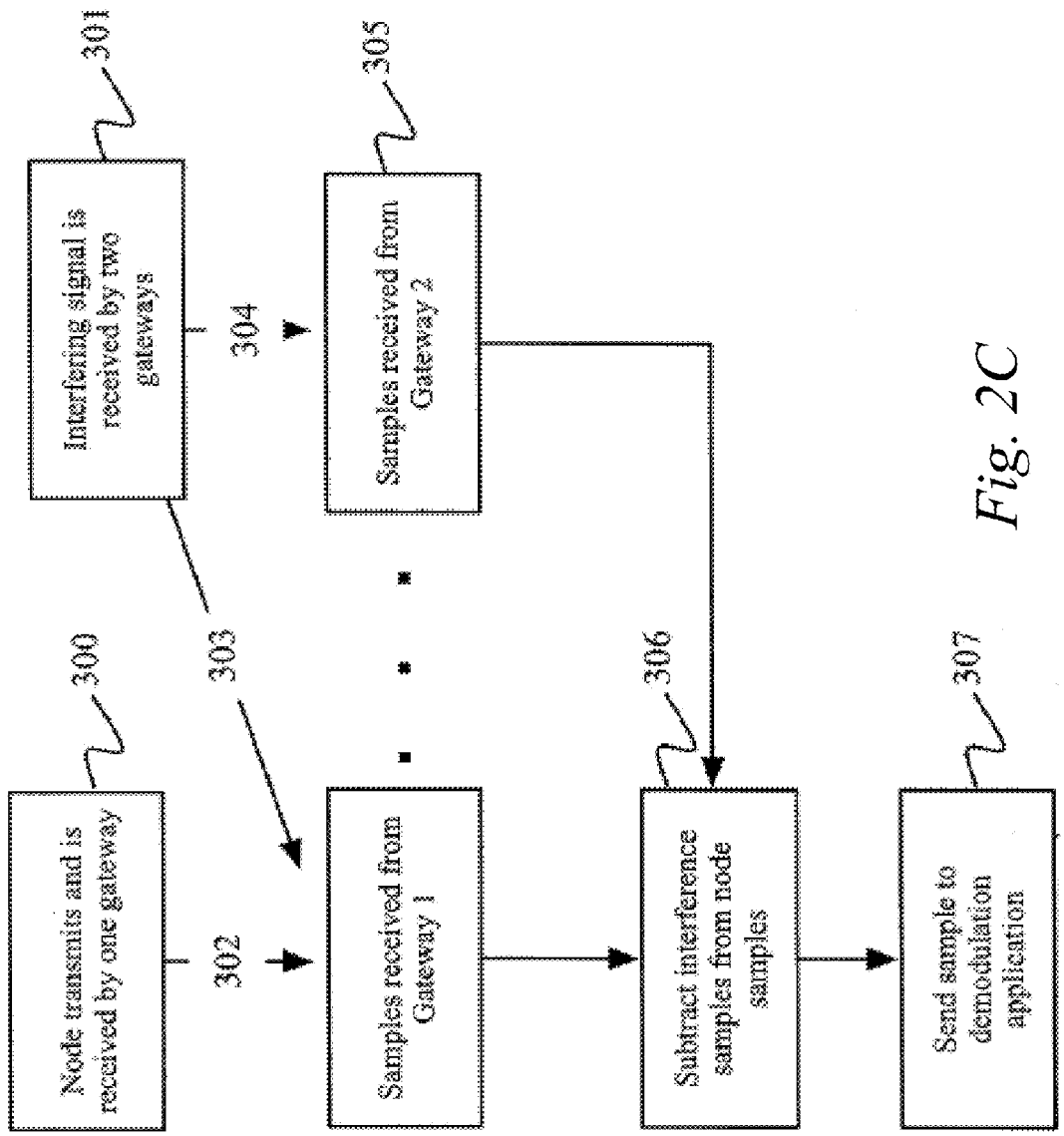
FIG. 2C is a flowchart illustrating an example of some steps that are applied to eliminate the effects of interfering signals.

FIG. 2C is a flow chart showing an example of the steps that can be used to implement an interference rejection module shown in FIG. 2A. In step 300, a node may transmit a radio frequency signal over a path 302 that is received by a first gateway. In step 301, interfering samples may be received at the first gateway via path 303 and received by a second gateway via path 304. One or more of the paths 303, 304 may be direct from node to gateway, via a ground wave path, via a reflection off of the ionosphere, or via another path. Interfering signals may be identified for example by connecting both vertically and horizontally polarized antennas to a gateway. For example, vertical antennas such as monopoles may have a lower radiation angle than other types of HF antennas such as loops. Vertically polarized signals may be more prominent from man-made noise sources such as automobile ignition and arcs in electric transmission lines. Signals from distant sources such as shortwave broadcast stations may be more likely to arrive at low reflection angles since they travel by multiple ionospheric reflections. Signals from interfering sources may also be reduced by using phased array techniques where a null is created in the overall antenna pattern in the direction of a known source of interference. One type of antenna may be more predisposed to acquiring node signals, e.g., than the other type of antenna. The other type of antenna may be predisposed to acquiring noise or interfering signals, e.g., noise or interfering signals that the first type of antenna may pick up in addition to the node signals.

In step 305, samples from gateway 1 comprising the desired signal plus the interfering signal, and samples from gateway 2 comprising the interfering signals may be passed to the next step 306. In step 306, samples containing the interfering signal may be subtracted from samples comprising the desired signal plus the interfering signal. In step 307, the desired signal samples may be sent to the demodulation process where the samples may be processed as if the samples were received without interfering signals.

The advantages of the embodiments described include, without limitation, minimizing the cost of providing a wireless network by using a central software defined radio server or servers. The signal to noise ratio of wireless links can be improved by combining signals received at multiple locations. SNR may be improved by combining signals that are received via different propagation paths and/or different propagation modes. For example, different signal paths may be created by the different propagation modes and/or by multipath effects created by movement of the ionospheric layers. Based on diurnal propagation some node transmissions (e.g., from a single node) may be received by one gateway and others by both gateways. Processing functions associated with complex radio waveforms can be performed in one or more powerful centralized servers, or distributed over a plurality of computing resources. Updates to certain SDR functions to accommodate new wireless standards can be rapidly implemented by changing only the software in the SDR servers.

Figure 2D:
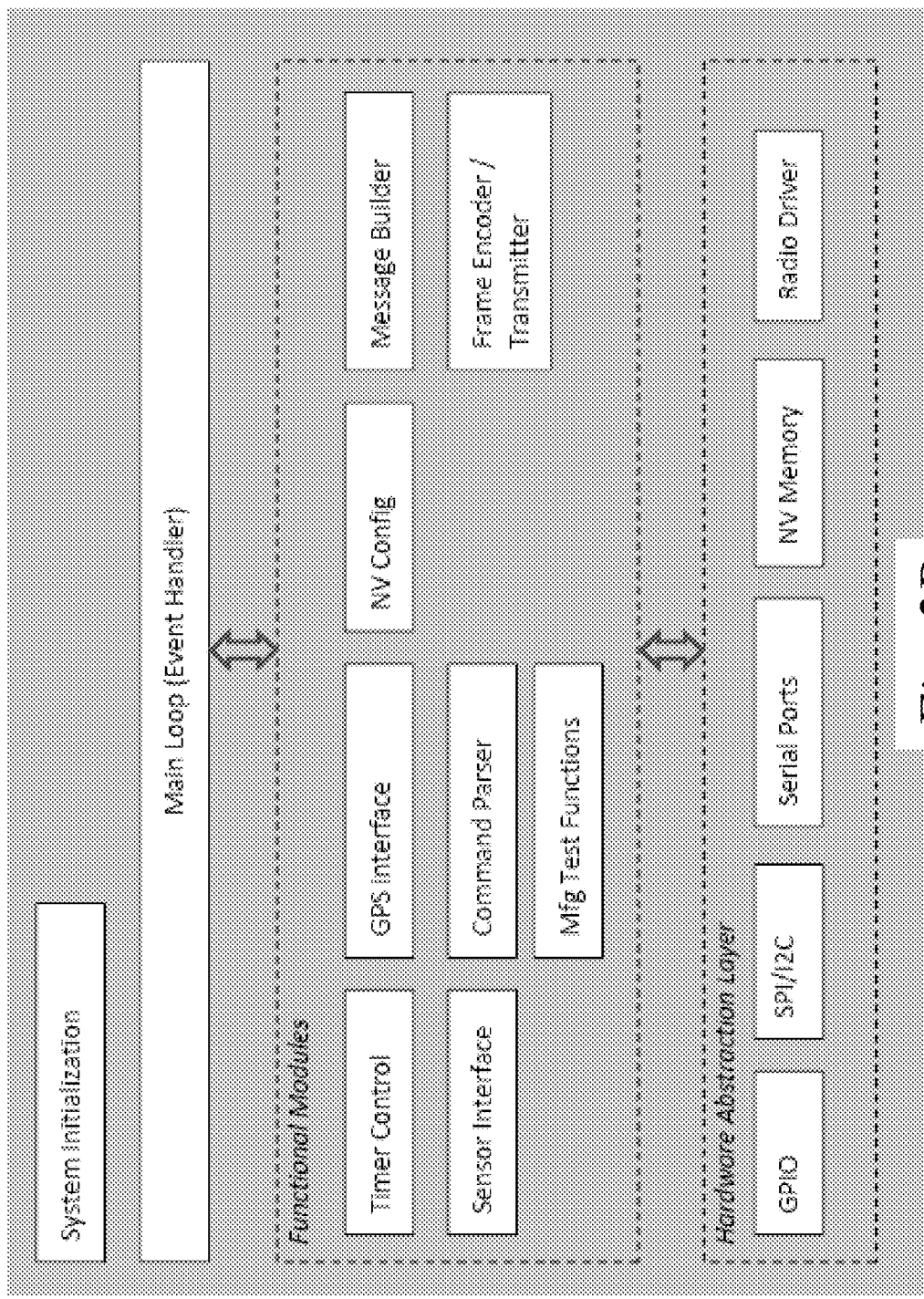
FIG. 2D is a block diagram depicting one embodiment of a wireless sensor node.

By way of illustration and not intended to be limiting, a RadioCloud node may comprise a battery-powered wireless sensor. The node's battery may comprise a rechargeable battery, e.g., that may be re-charged from solar energy. The Node may include a microcontroller (e.g., a 8-bit processor) with a set of peripherals, such as (i) a GPS module, for obtaining geolocation information and a global timing reference, (ii) digital sensors, which may comprise sensor ICs with digital interfaces that connect to either the microcontroller's I2C or SPI bus for example, (iii) analog sensors, which may include sensor circuits with analog outputs that connect to the microcontroller's A/D converters, and (iv) a radio transmitter, which may include a digitally-controlled frequency-shift keying (FSK) transmitter for example. In some embodiments, the transmitter may be a phase-shift keying (PSK) transmitter, or a transmitter supporting any other modulation techniques. From an interface perspective, and by way of example, the microcontroller may control a digitally-controlled HF oscillator to select a channel, and may sequence a general purpose input/output (GPIO) parallel output port to provide any necessary digital baseband signals. For illustration, FIG. 2D depicts one embodiment of a block diagram including functional modules of a node. The node may also provide one or more of the following: (v) control signals, where one or more GPIOs may be used to selectively turn power on or off to parts of the node such as the radio or the sensor circuits to conserve power, (vi) light-emitting diode (LED), buzzer, and/or buttons, to communicate with a human at manufacturing or install time, and (vii) a serial console, which may include a synchronous serial interface with a command parser for device configuration, manufacturing and debugging, for example.

In certain embodiments, the responsibilities of the node microcontroller may include any one or more of the following: (i) waking up certain functions of the node periodically on a timer, (ii) reading the sensor(s), (iii) interfacing with the GPS, (iv) maintaining a real time clock (RTC), (v) generating sensor reports, (vi) selecting an appropriate channel and timeslot for transmission/reception, (vii) encoding the reports for transmission, (viii) reading/writing configuration settings, e.g., nonvolatile (NV) configuration settings, (ix) responding to external buttons/input-devices and setting LED or buzzer outputs as necessary, (x) providing a serial console for device configuration, manufacturing test, and/or debugging for example, and (xi) providing a bootloader used for field upgrade and/or factory programming of firmware. In some embodiments, the node's software may be simple enough that it can be implemented as a single task, with an event-driven state machine for the main loop, for example. Interrupt handlers may support any timing-dependent I/O and timing functions. The GPS location may be sent occasionally or at set times to conserve transmission bandwidth.

In some embodiments, a node generates and/or encodes sensor reports for transmission to one or more gateways. The node may add any necessary MAC-level control information, such as dotting sequences, sync words, or protocol identifiers. The node may perform forward error correction (FEC) encoding, for example, using a rate 1/2 (k=32) convolutional code to protect the packet from errors. The node may include or incorporate library code to implement the encoding. The node may perform data whitening to ensure a clean spectrum. The node may perform FSK, PSK or other types of encoding. Depending on how the modulation is performed, the node may generate a 4-bit parallel word for each symbol, outputting a digital-to-analog conversion (DAC) value, or issue a command to an numerically-controlled oscillator (NCO) to shift to a specified frequency.

Figure 2E:
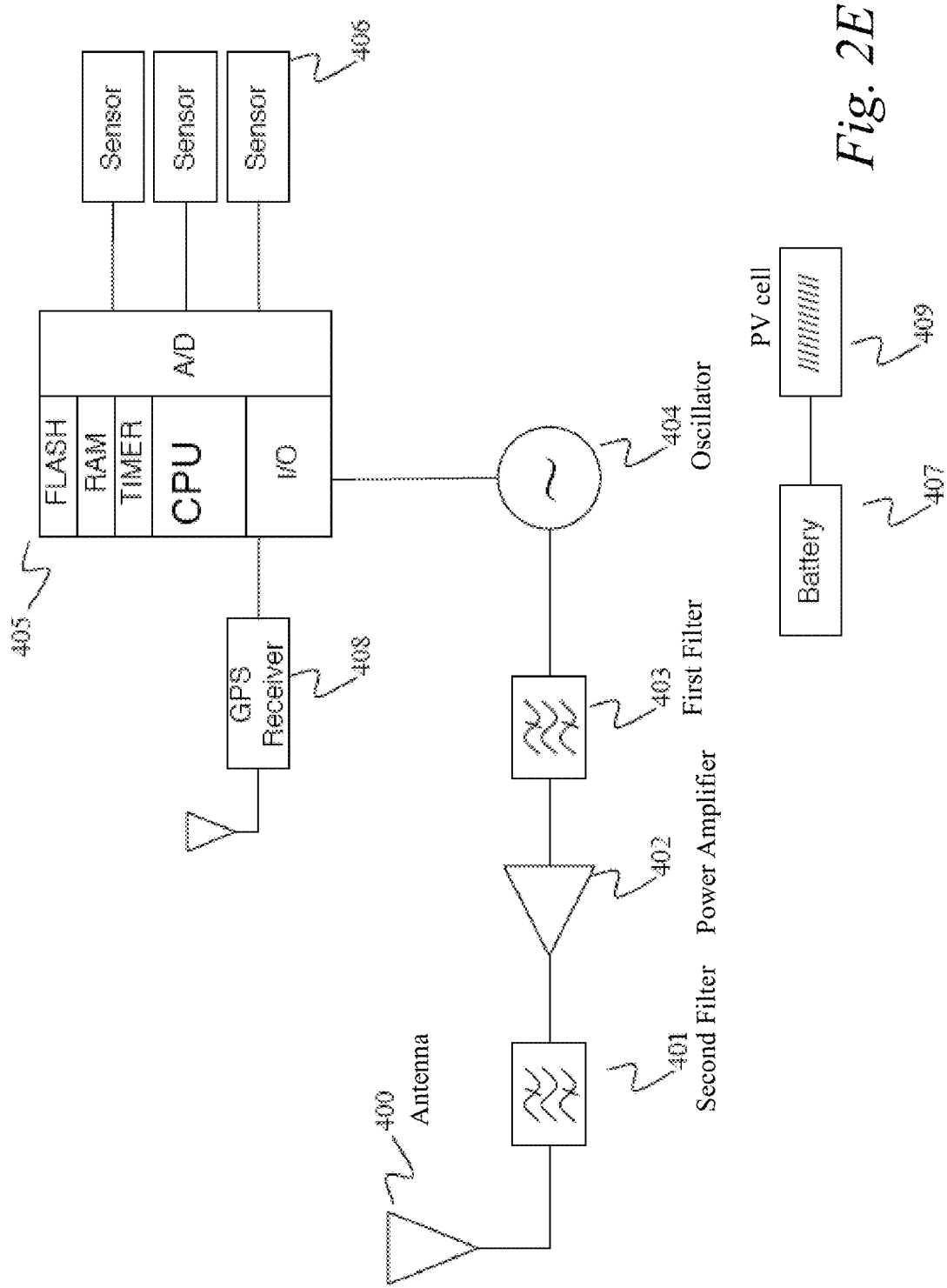
FIG. 2E is a block diagram depicting another embodiment of a wireless sensor node.

FIG. 2E depicts one embodiment of a RadioCloud node. The node may include one of more sensors 406, such as for monitoring temperature, humidity, wind speed/direction, soil moisture, etc. The sensor(s) may be connected to a micro-controller (MCU) 405. The MCU may include an A/D converter, FLASH and RAM memory, I/O ports and/or a CPU. A timer, e.g., incorporated into the MCU may be used to periodically 'wake' the MCU from a low power sleep mode, so as to conserve battery power. When the MCU wakes up, data from the sensors 406 may be digitized by the A/D converter and combined with synchronization and forward error correction (FEC) information to create a packet. Once the sensor packet is created, a transmission time and frequency may be selected by the node software based on a combination of configuration and/or GPS information. Once the appropriate time and frequency for a transmission is determined, a transmission period may begin.

During the transmission period, binary information from the packet may be used to vary the frequency of an oscillator 404, which may be a voltage controlled crystal oscillator (VCXO), a frequency synthesizer or a direct digital synthesizer (DDS), which is used to generate the carrier frequency. The output signal from the oscillator may be filtered (403) to remove spurious signals and then amplified to a power level suitable for transmission by the power amplifier 402. The power output required for reliable communications may be reduced by virtue of the ability of the central SDR server to combine information from multiple propagation paths and multiple gateways. The output of the power amplifier 402 may comprise a frequency modulated carrier and may be filtered by a second filter 401 to remove spurious signals generated by the power amplifier 402. The filtered power amplifier output may be applied to an antenna 400 which may be a custom or conventional antenna such as a monopole, dipole or Yagi, or a compact antenna such as a loop antenna which may be ferrite loaded to further reduce its size. Elements of the node may be powered by the battery 407 which could be a disposable primary cell or a rechargeable secondary cell. If a secondary cell is used, it could be recharged by a photo voltaic (PV) cell 409. In some other embodiments, SDR techniques and a D/A converter may be used to generate the carrier frequency, which may be a less expensive approach for FSK, PSK or certain other types of waveforms.

A node may transmit data as RF signals, which may comprise data packets (sometimes interchangeably referred to as frames, datagrams or messages). The node may encode the packets at two or more layers, e.g., the PHY layer and the MAC layer. The PHY layer may represent physical encoding of symbols on the radio carrier, for example, with 4-FSK transmitted at 1.46 baud (WSPR), or 16-FSK transmitted at a predetermined baud, for example. Packet data payload may be limited to 50 bits, although this may be reconfigured or extended. Certain embodiments of a node may support or employ Multiple frequency-shift keying (MFSK) and any types/variations thereof, such as dual-tone multi-frequency (DTMF), MFSK8, MFSK16, Olivia MFSK, Coquelet, Piccolo, ALE (MIL-STD 188-141), DominoF, DominoEX, THROB, CIS-36 MFSK or CROWD-36, XPA, XPA2, FSK441, JT6M, JT65, without limitation. Some embodiments may support or employ any type or variation of phase-shift keying (PSK), such as differential phase-shift keying (DPSK), Binary phase-shift keying (BPSK), Quadrature phase-shift keying (QPSK) and variations thereof (e.g., OQPSK, π/4-QPSK, SOQPSK, DPQPSK). A node may also support amplitude-shift keying (ASK), e.g., OOK, 8VSB, or any combination of ASK, PSK and/or FSK. Certain embodiments of a node may support or employ frequency-division multiplexing (FDM), such as OFDM, phase division multiplexing (PDM), Quadrature amplitude modulation (QAM), Ultra-wideband (UWB), Continuous phase modulation (CPM) and/or spread-spectrum techniques (e.g., DSSS, FHSS, THSS, CSS, UWB).

By way of non-limiting illustration, a PHY frame may be encoded using a MAC payload of N=50 data bits. The node may apply binary encoding using (k=32, r=1/2) convolutional code to yield (N+k−1)*2=162 code bits, for example. The node may modulate the code bits using continuous-phase 4-FSK for example, where one bit of each symbol may be driven by the a (e.g., 16-bit) pseudorandom synchronization vector. The node may transmit the resulting (162+162)/2=162-symbol frame at 1.46 baud with 1.46 Hz tone spacing yielding a final transmission length of 110.6 seconds. Each transmission may be timeslotted, starting two seconds into an even 2-minute boundary per Coordinated Universal Time (UTC) time period (e.g., at hh:00:02, hh:02:02, etc), for example. The transmission may occupy a bandwidth of approximately 6 Hz.

In some embodiments, a PHY frame may be encoded using a MAC payload of N bits, such as 127 bits. The node may apply binary encoding using (k=32, r=1/2) convolutional code to yield (N+k−1)*2=316 code bits. The node may modulate the code bits using continuous-phase 16-FSK, where the message is preceded by a (e.g., 16-symbol) balanced synchronization (sync) vector, for example. The node may transmit the resulting (316/4)+16=95-symbol frame at a predetermined baud at a specific tone spacing. Each transmission may be timeslotted. The sync vector may be employed to provide an unambiguous reference to the beginning of the packet to facilitate frame decoding. The sync vector may be designed to provide an even balance of ones and zeros and exhibit low autocorrelation. At least 14 of 16 symbols may have to match the sync vector before an attempt to decode the frame. The node may be configured to allow a margin of ±4 symbols.

By way of non-limiting illustration, a MAC frame may include a fixed outer wrapper and a variable inner message payload, and may include one or more of the following fields:

| Field | Type | Number of bits | Description |
|---|---|---|---|
| SourceMacAddress | UINT | 28 | Address of transmitting Node |
| MsgType | UINT | 4 | Type of message enclosed |
| MsgPayload | variable | ≤68 | Message payload |

The length of the message payload may depend on the type of message. By way of example, for a longest message type of 68 bits, a maximum MAC frame length of 28+4+68=100 bits. To account for higher demand for data, room for expansion up to 127 bits or above can be implemented.

In some embodiments, a MAC frame may include one or more of the following message types: (i) MsgType 0x0—INFO (46 bits), of which an illustrative embodiment is described below:

| Field | Type | Number of bits | Description |
|---|---|---|---|
| Longitude | UINT | 23 | GPS location of node (5 m resolution) |
| Latitude | UINT | 23 | GPS location of node (5 m resolution) |
| FirmwareVersion | UINT | 10 | Firmware version |

(ii) MsgType 0x1—SENSOR_DATA (36 bits), of which an illustrative embodiment is described below:

| Field | Type | Number of bits | Description |
|---|---|---|---|
| SequenceNumber | UINT | 8 | Rollover counter incremented for each unique transmission. |
| Status | UINT | 4 | Node status<br>0x0 = Normal<br>0x1 = Battery low<br>0x2 = GPS failure<br>0x3 = Other failure<br>0x4-0xF = reserved |
| SensorRecord_0 | RECORD | 28 | Current SensorRecord (see below) |
| SensorRecord_1 | RECORD | 28 | Previous SensorRecord |

A copy of a previous SensorRecord may be included in the message for redundancy in case the previous transmission was not received. A SensorRecord may be defined as:

| Field | Type | Number of bits | Description |
|---|---|---|---|
| Temperature | UINT | 10 | Measured temperature, in 0.1 deg C., with 0x00 = −40.0 deg C. |
| Humidity | UINT | 10 | Measured relative humidity, in 0.1%, with 0x00 = 0.0% |
| Pressure | UINT | 8 | Measured pressure, in 0.1 kPa, with 0x00 = 85 kPa | and (iii) MsgType 0xF—TEST (40 bits), of which an illustrative embodiment is described below:

| Field | Type | Number of bits | Description |
| --- | --- | --- | --- |
| SequenceNumber | UINT | 8 | Rollover counter incremented for each unique transmission. |
| DebugInfo | UINT | 32 | Debugging information |

Additional message types may be configured or reserved for future use/expansion.

As discussed above, a plurality of gateways may receive signals transmitted by one or more nodes. A gateway may comprise an intermediary device that bridges a wireless network (including the one or more nodes) to a wired network (including a SDR server). A gateway may receive signals or radio packets comprising one or more sensor reports from nodes, and may forward these to a server (sometimes referred to as a Cloud Server) on the internet, for example. In certain embodiments, the radio packets are not demodulated at the gateway. The gateway's signal processing may stop at downsampling the signal to blocks of I and Q baseband samples. A gateway may comprise a network-enabled single-board computer (SBC) (e.g., a Gateway Interface Processor (GIP)). The gateway may run embedded Linux or another operating system. The gateway may be connected to a SDR receiver, either directly or via a network connection.

Figure 2F:
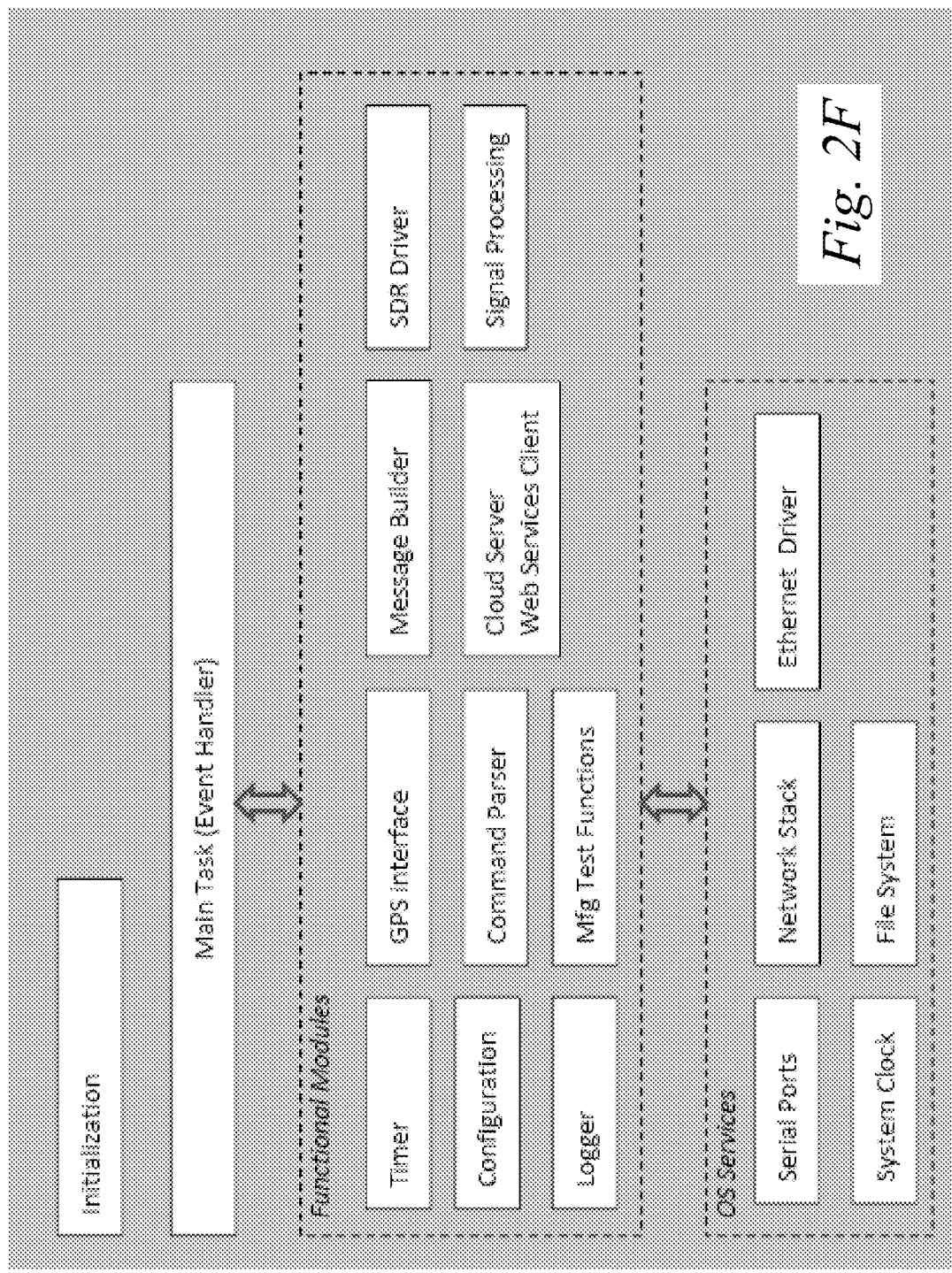
FIGS. 2F and 2G are block diagrams of embodiments of a gateway for receiving and processing node transmissions
Figure 2G:
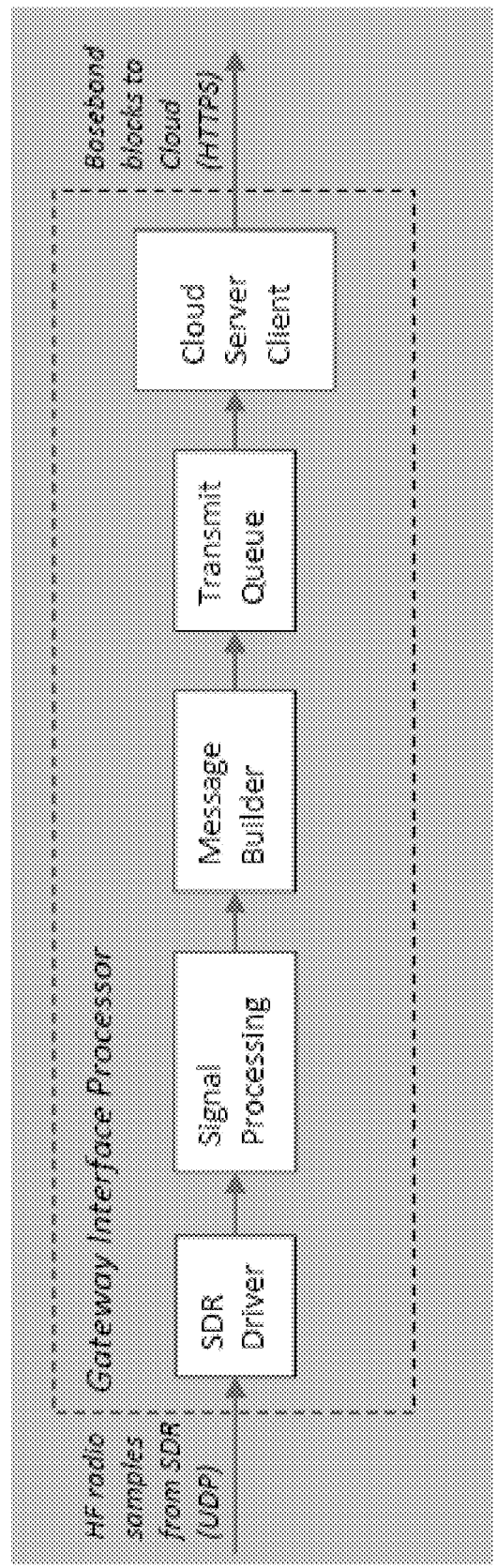

In certain embodiments, the gateway includes a plurality of modules which may be implemented in hardware, or in software executing on hardware of the gateway. Some of these modules may provide functionality including one or more of: (i) interfacing with an SDR receiver, (ii) downsampling of the full received HF band into individual baseband signals for each channel, (iii) apportioning of each baseband signal according to channel and timeslot, yielding "baseband blocks", (iv) computing a thumbnail spectrogram for each block, (v) labeling and timestamping of each baseband block, attaching a spectrogram, and uploading it to the SDR server, and (vi) interfacing with a GPS module for geolocation and timing reference, and/or (vii) reading/writing of a configuration file. Some of these modules may provide (viii) a serial console for configuration, manufacturing test, and debugging, (ix) a web server control panel for configuration and monitoring, and/or event logging. Certain modules may incorporate or be implemented with a programming or script language, such as Python or C. FIGS. 2F and 2G are block diagrams of embodiments of a gateway for receiving and processing node transmissions. On the signal processing front, the gateway may incorporate libraries such as the GNU Radio library. On the networking front, the gateway may incorporate libraries for XML, HTTP, SSL, JSON, etc.

The gateway may include a SDR interface for communicating with and/or controlling an SDR on a connected computing device or a remote server. The SDR interface may include an Ethernet interface, for example. In certain embodiments, the SDR interface may include a graphical interface. The graphical interface may be used for controlling SDRs written in C and/or Qt that runs on Linux, for example. The SDR interface may operate on or support one or more network protocols, such as (i) a TCP socket for controlling the SDR, for example using Amateur Station Control Protocol (ASCP), and a UDP socket for low-overhead transfer of sample data, which may be a custom format. The gateway or SDR interface may include a DHCP client for obtaining an IP address, and may include a device discovery mechanism using a UDP protocol sometimes referred to as SNDP.

In certain embodiments, the gateway samples the HF band, which may comprise a predefined number of subchannels (e.g., 100 subchannels). The gateway may isolate each subchannel for processing. The process of simultaneously band-pass filtering, decimating and downconverting a signal to baseband is sometimes referred to as downsampling. Timing synchronization to determine timeslot boundaries may be derived from a GPS source. By way of illustration, if a node transmission nominally includes 32 bytes of information encoded at rate 1/2, is modulated at 50 baud, occupies 800 Hz of bandwidth, and is sampled at 2 kSps @ 16 bits per quadrature, then a baseband block ready for upload might occupy about 22 kBytes.

A gateway may include a web service client, to communicate as a client to the SDR server. The web service client may use a web service remote procedure call (RPC) framework such as SOAP or REST. Web service requests and responses may be built atop HTTP. In some embodiments, where the gateway sends moderate size data blocks to the server (e.g., ~22 kBytes), the web service design may benefit from using a binary encoding format.

The gateway may convey samples of the modulated signals to a SDR server over a network. These samples may be sometimes referred as gateway-to-cloud (G2C) messages. In a given timeslot, the gateway may send a block of received sample data to the SDR server. The gateway may establish a TCP connection on a port (e.g., port 8081) to send the messages. In some embodiments, the gateway may use a Representational State Transfer (REST) based web service to send the messages. A gateway's serial number may be defined as its Ethernet MAC address. By way of illustration, the G2C messages may have the following message format:

| Field | Type | Number of bits | Description |
| --- | --- | --- | --- |
| SerialNumber | UINT | 6 | Unique serial number assigned to each Gateway |
| Timeslot | UINT | 2 | Timeslot number relative to the current day, with timeslot 0 at 00:00:00Z UTC |
| SpectrumThumbnail | ARRAY | 512 | Spectrogram of entire captured frequency band, amplitude only, dB scale with 0x00 = −110 dB |
| FullbandSampleBlock_I | ARRAY | | Array of radio samples, I channel, 16 bits/sample |
| FullbandSampleBlock_Q | ARRAY | | Array of radio samples, Q channel, 16 bits/sample |

The SDR server or Cloud server may receive samples of the modulated signals (sometimes referred to as sample blocks or G2C messages) from one or more gateways in the network. In some embodiments, the SDR server may use the following database record format. The SDR server may store received G2C messages in such a format until the messages can be paired with available copies from other gateways and SIMO processed.

| Field | Type | Number of bits | Description |
| --- | --- | --- | --- |
| GatewayIpAddress | UINT | 4 | IP address of sending Gateway |
| GatewaySerialNumber | UINT | 6 | Unique serial number assigned to each Gateway |
| Timeslot | UINT | 2 | Timeslot number relative to the current day, with timeslot 0 at 00:00:00Z UTC. |
| SpectrumThumbnail | ARRAY | 512 | Spectrogram of entire captured frequency band, amplitude only, dB scale with 0x00 = −110 dB |
| FullbandSampleBlock_I | ARRAY | | Array of radio samples, I channel, 16 bits/sample |
| FullbandSampleBlock_Q | ARRAY | | Array of radio samples, Q channel, 16 bits/sample |

In some embodiments, the format of a post-processed sample block (e.g., post-SIMO processing) may look like:

| Field | Type | Number of bits | Description |
| --- | --- | --- | --- |
| Timeslot | UINT | 2 | Timeslot number relative to the current day, with timeslot 0 at 00:00:00Z UTC |
| NarrowbandSampleBlock_I | ARRAY | | Array of radio samples, I channel, 16 bits/sample |
| NarrowbandSampleBlock_Q | ARRAY | | Array of radio samples, Q channel, 16 bits/sample |

The SDR server may process the sample blocks or G2C messages, and may deposit the resulting data records in a database for consumption by an end-user application. By way of illustration, a decoded sensor report extracted from a post-processed sample block may comprise the following:

| Field | Type | Number of bits | Description |
| --- | --- | --- | --- |
| SequenceNumber | UINT | 8 | Rollover counter incremented for each unique transmission. |
| Status | UINT | 1 | Node status 0x0 = Normal 0x1 = Battery low 0x2 = GPS failure 0x3 = Other failure 0x4-0xF = reserved |
| SensorRecord | RECORD | 6 | Refer to SENSOR_DATA packet |

The SDR server may comprise a virtual server running Linux, Windows or another operating system. In certain embodiments, the SDR server can be split across multiple servers, e.g. leverage on a cloud database service for the backend, and a lightweight application server such as for the front end. This implementation may be scaled to multiple instances of the same application running on different machines and even at different URLs, to support multiple SDR servers for example. Each instance may communicate with the same database servers and designate which nodes are associated with which particular instance. The SDR server application tasks could be implemented in languages such as C, Python or Java.

Figure 2H:
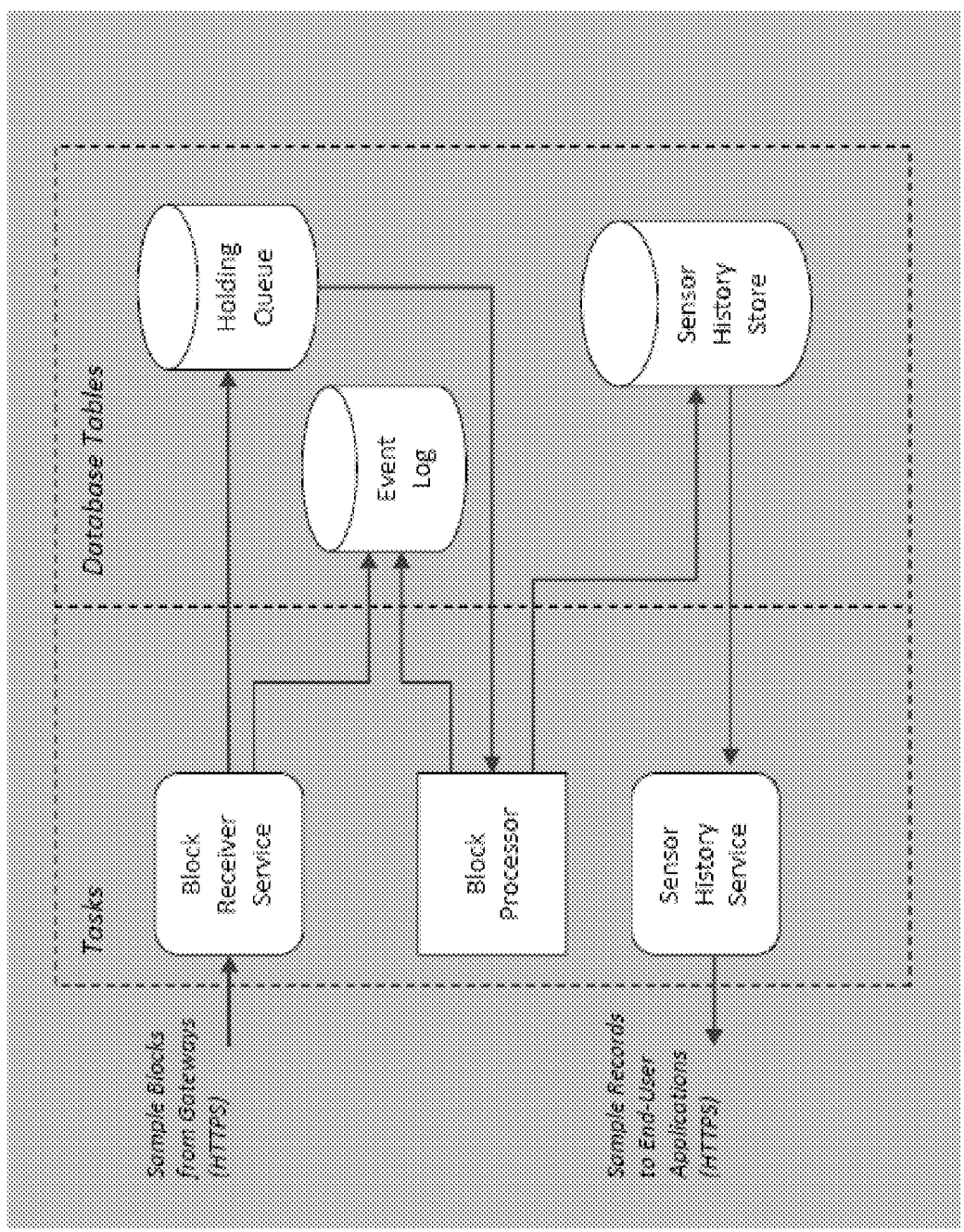
FIG. 2H depicts a block diagram of one embodiment of a SDR server.

The SDR server may include modules implemented in hardware, or in software executing on hardware. Certain modules may provide functionalities such as: (i) providing a web service to receive baseband sample blocks from the gateways, (ii) processing the sample blocks to extract the sample record and spectrogram data, (iii) writing the decoded sample records and spectrograms to a history database, (iv) providing a web service to allow end-user applications to access the history database, (v) providing a web server control panel for configuration and monitoring, and (vi) performing event logging for debugging/diagnostics. By way of illustration, FIG. 2H depicts a block diagram of one embodiment of a SDR server.

The SDR server may be configured to perform significant signal processing. The SDR server may be configured via SDR software, applications and/or custom code. The SDR server may provide various signal processing functions, including SIMO antenna diversity combining, FSK demodulation, discrete Fourier transform implementation to resolve the tones, recovery of carrier phase for coherent demodulation, and/or timing recovery. With a small sample duration, timing synchronization may be derived without an explicit dotting sequence preamble. The node may ensure a sufficient number of transitions in the data by applying a scrambling sequence to the data at the transmitter. The SDR server can recover bit synchronization by finding a bit phase that maximizes the power in each "frequency bucket" of the DFT when summed over each bit duration. The SDR server may also perform FEC decoding.

Figure 2I:
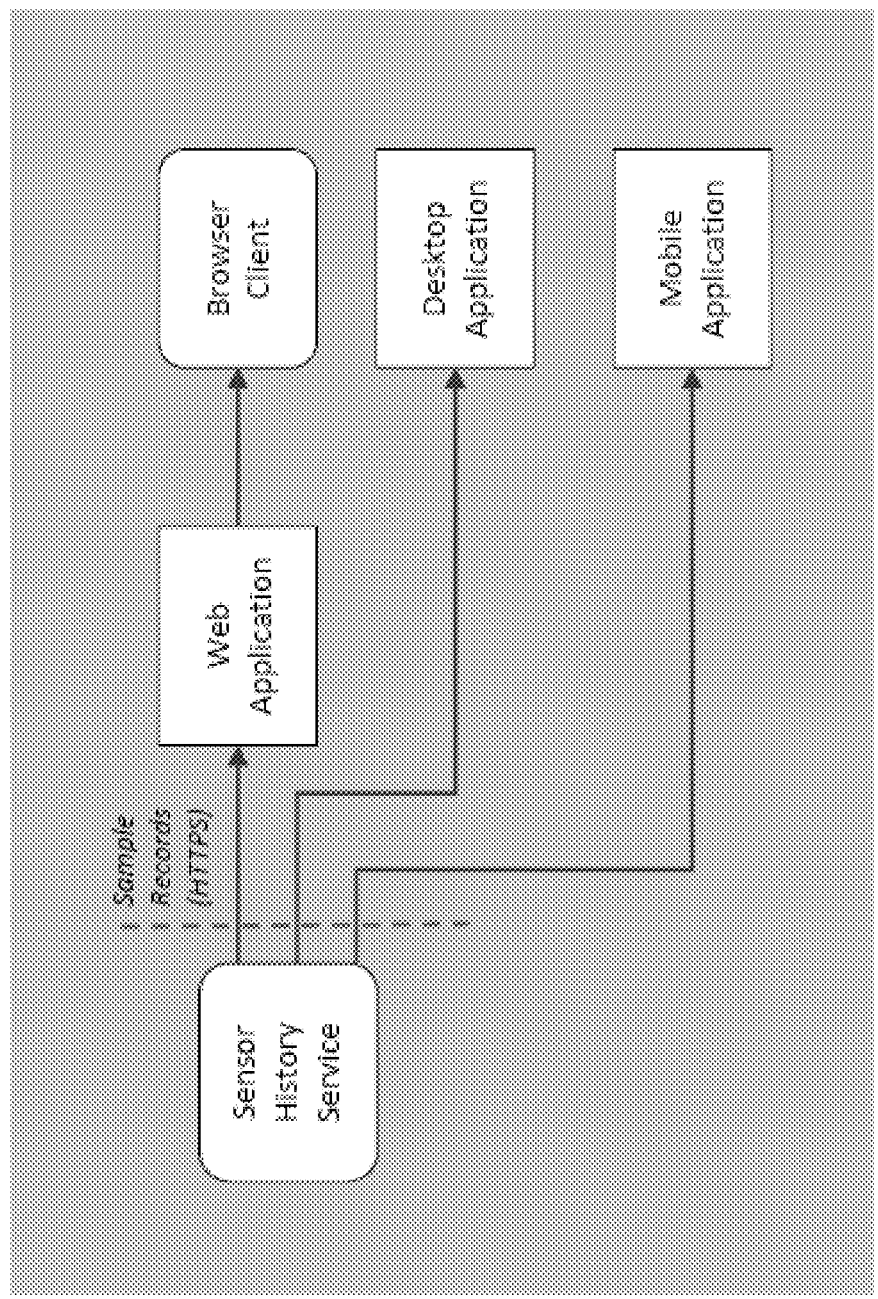
FIG. 2I depicts one embodiment of data flow diagram for an end-user application.

An end-user may access some portion of the sensor data recovered at the SDR server. One of more end-user applications may retrieve sensor data from the SDR server's Sensor History Store and present it in a graphical format to an end-user. An end-user application may perform any one or more of the following: (i) interact with the Sensor History Service to retrieve sensor data, (ii) provide a Sensor geographic view, showing each sensor as a flag on a scroller map with sensor readings in a popup box for example, (iii) provide a Sensor tabular view, showing each sensor as a row with its most recent report for example, (iv) provide a History tabular view, showing each sensor report as a row for a single sensor or group of selected sensors for example, and (v) provide a History graphical view, graphing all sensor values for one or more selected sensors over a selected period of time for example. FIG. 2I depicts one embodiment of data flow diagram for an end-user application.

An end-user application may monitor new sensor reports and generating alarms, for example if: (a) a sensor value exceeds a specified range, and/or (b) a sensor fails to report before an alarm timeout expires. An end-user application may comprise a standalone desktop application, a browser-based web application, or a standalone mobile application.

Figure 2J:
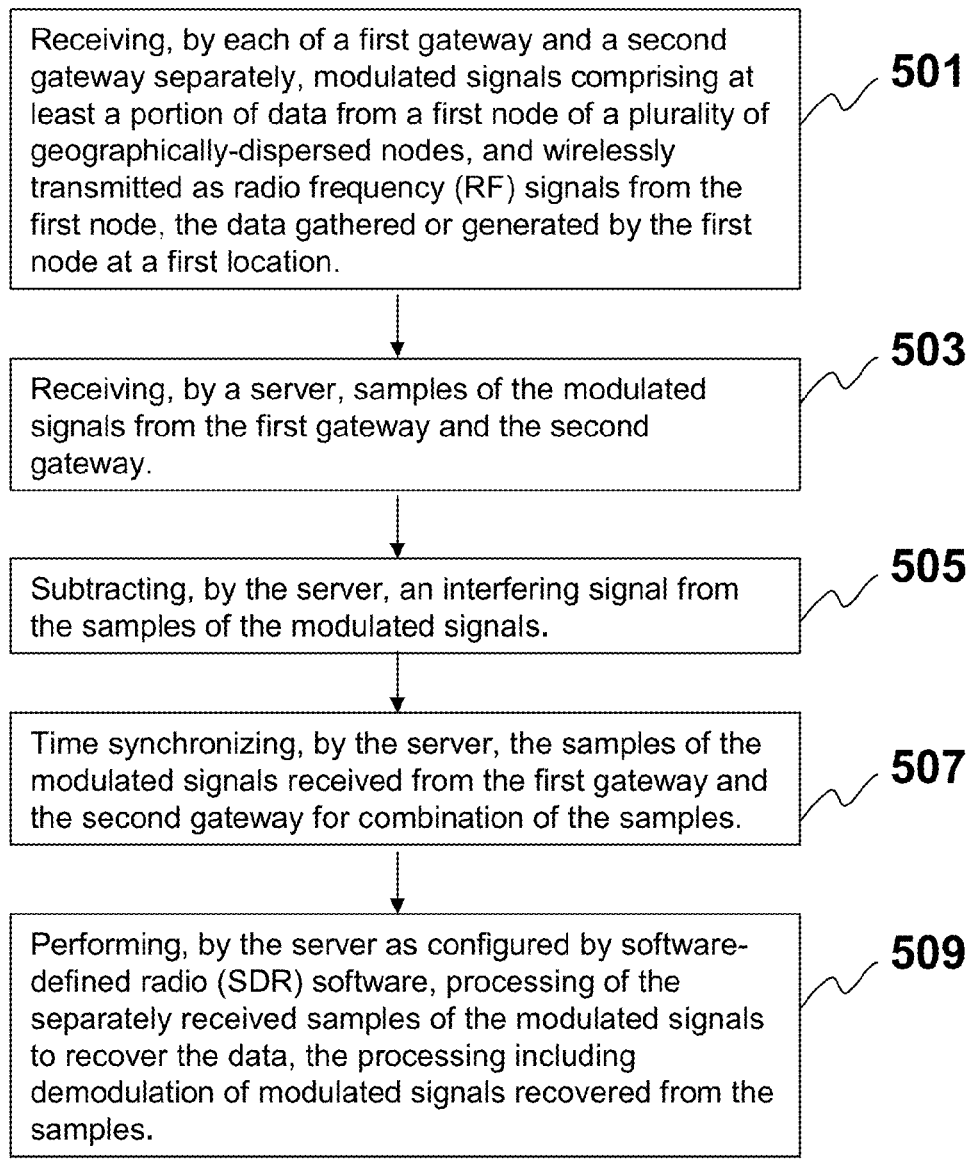
FIG. 2J is a block diagram depicting one embodiment of a flow diagram for a method of a distributed radio communications network.

Referring to FIG. 2J, one embodiment of a flow diagram relating to a method of a distributed radio communications network is depicted. The method may include separately receiving, by each of a first gateway and a second gateway, modulated signals comprising at least a portion of data from a first node of a plurality of geographically-dispersed nodes (501). The modulated signals may be wirelessly transmitted as radio frequency (RF) signals from the first node. The data may be gathered or generated by the first node at a first location. A server may receive samples of the modulated signals from the first gateway and the second gateway (503). The server may subtract an interfering signal from the samples of the modulated signals (505). The server may time synchronize the samples of the modulated signals received from the first gateway and the second gateway for combination of the samples (507). The server may be configured by software-defined radio (SDR) software to perform processing of the separately received samples of the modulated signals to recover the data (509). The processing may include demodulation of modulated signals recovered from the samples.

Referring to (501), each of a plurality of gateways may separately receive modulated signals comprising at least a portion of data from a first node of a plurality of geographically-dispersed nodes. The plurality of gateways may comprise a first gateway and a second gateway. The data may be gathered or generated by the first node at a first location. For example, the data may include a measurement made by the node, including environmental attributes such as humidity or temperature, or a detection of an event, for example to trigger an alert, notification or event log. The node may include the data in one or more signals comprising one or more packets, frames, datagrams or messages for transmission. The node may add MAC-level control information, such as dotting sequences, sync words, or protocol identifiers to each signal or packet.

The node may perform forward error correction (FEC) encoding, for example, using a rate 1/2 (k=32) convolutional code to protect each signal or packet from errors. The node may modulate code bits in the signals using continuous-phase 4-FSK or 16-FSK for example, although various other modulation scheme may be implemented. The node may determine a time slot and/or a frequency to transmit the modulated signal. This determination may be based at least in part on one or more of: a location of a receiving gateway, a distance from a receiving gateway, terrain, time of day, season, weather, antenna type and/or transmission mode supported by a receiving gateway. The modulated signals may be wirelessly transmitted as radio frequency (RF) signals from the first node. The first node may transmit a low-power, RF signal between 3 and 30 megahertz (MHz), within the HF band or another frequency band/range. The first node may transmit a RF signal over a transmission path of more than 10 kilometers (e.g., 50 km, 300 km or 600 km) to at least one of the first gateway and the second gateway.

Each of the plurality of gateways may be located at a different location, and may include particular type(s) of antennas for receiving various types of signals and/or transmissions. The modulated signals may be wirelessly transmitted as radio frequency (RF) signals from the first node. Each of the first gateway and the second gateway may receive the modulated signals as RF signals transmitted via a direct path from the first node, a ground wave path, or ionospheric reflection (e.g., NVIS and long skywave). The first gateway and the second gateway may receive the modulated signals as RF signals transmitted via at least two of: a direct path from the first node, a ground wave path, and ionospheric reflection. In some embodiments, at least one of the first gateway and the second gateway receives one of the RF signals reflected off of the Earth's ionosphere.

The one or more gateways may be configured to include a set of distributed antennas. Antennas on each gateway could be selected and/or configured to give a preference for one type of propagation or another. These distributed antennas may collect disparate signals from multiple paths or propagation modes from one or more locations for aggregation/processing at a predefined central location. The distributed antennas may be configured to support antenna-diversity and/or beamforming strategies. One or both of the first and second gateways may receive a particular signal transmission from the node. In some cases, a signal may be obstructed, too weak, or overcome by noise to be received at a particular gateway. For example, based on diurnal propagation some node transmissions may be received by one gateway and others by both gateways.

Each gateway may sample the received signals. Each of the gateway may perform sampling on signals detected in the HF band, which may include a predefined number of subchannels. The gateway may isolate each subchannel for processing. Signals received may be down-converted to a baseband frequency, and sampled at each of the respective gateways. Each gateway may perform downsampling, including one or more steps of band-pass filtering, decimating and downconverting a signal to baseband. Each gateway may interface with a GPS module for geolocation and timing reference. Each gateway may perform timing synchronization to determine timeslot boundaries, e.g., using timing information from a GPS source.

Each gateway may apportion each baseband signal according to channel and/or timeslot, to yield "baseband blocks". In certain embodiments, a gateway may compute a thumbnail spectrogram for each block. The gateway may label and/or timestamp each baseband block. The gateway may attach a spectrogram, and may upload each block to a SDR server. The radio signals or packets may not be demodulated at the gateway. The gateway's signal processing may stop at downsampling the signal, e.g., to blocks of I and Q baseband samples.

One or both gateways may convey samples of the modulated signals to a SDR server over a network. These samples may be sometimes referred as gateway-to-cloud (G2C) messages or sample blocks. In a given timeslot, the gateway may send a block of received sample data to the SDR server. The gateway may establish a TCP connection on a port to send the samples. In some embodiments, the gateway may use a Representational State Transfer (REST) based web service to send the samples. One or both of the gateways may compress the modulated signals received by the respective gateway, and communicate the compressed modulated signals to a central location for further processing. For example, a gateway may compress one or more samples of the modulated signals before conveying to a SDR server over a network.

Referring now to (503), a server may receive samples of the modulated signals from the first gateway and the second gateway. A SDR server may receive modulated signals from the first gateway and the second gateway. The SDR server may separately receive modulated signals from one or both of the first gateway and the second gateway. The SDR server may separately receive samples of the modulated signals from each of the gateways. The first gateway, the second gateway and the server may be connected by a communications network, such as a wide area network or the Internet. The SDR server may receive samples from each gateway within different timeslots, e.g., timeslots assigned to each of the gateways. In some embodiments, the SDR server may store the received sample in a database record format, such as that described above. The SDR server may store the received samples in such a format until the samples can be paired with available copies from other gateways. The SDR server may store the received samples in this format until the samples can be SIMO/MIMO processed.

Referring now to (505), the server may subtract an interfering signal from the samples of the modulated signals. The server may subtract an interfering signal from modulated signals received by one or both gateways. Interfering signals may be identified for example by connecting different antennas (e.g., vertically and horizontally polarized antennas) to a gateway or separate gateways. One type of antenna may be more predisposed to acquiring node signals than the other type of antenna. The other type of antenna may be predisposed to acquiring noise or interfering signals, e.g., noise or interfering signals that the first type of antenna may pick up in addition to the node signals.

The SDR server may receive samples from a gateway (e.g., the first gateway) comprising the desired node signal plus an interfering signal, and samples from another gateway (e.g., the second gateway) comprising the interfering signal. In some embodiments, the SDR server may receive samples from a first antenna (e.g., of the first gateway) comprising the desired node signal plus an interfering signal, and samples from another antenna (e.g., of the first gateway) comprising the interfering signal. The SDR server may perform interference rejection and/or noise filtering. The SDR server may subtract samples comprising the interfering signal from samples comprising the desired signal plus the interfering signal. The SDR server may extract the desired signal samples based on the subtraction, and may send the desired signal samples to a demodulation process where the samples may be processed as if the samples were received without interfering signals.

Referring now to (507), the server may time-synchronize the samples of the modulated signals received from the first gateway and the second gateway for combination of the samples. The SDR server may forward samples of the received signals to an antenna diversity module on a SDR server, where they may be time-synchronized and combined, e.g., to improve signal to noise ratio (SNR) and/or other parameters. The SDR server may time-synchronize the samples using local GPS information or other timing information. The samples may be added together or otherwise combined, despite being based on signals received over a distributed set of antennas/gateways). The SDR server may drop or remove any redundant or duplicate samples. The SDR server may send the combined samples to a demodulation module of the SDR server, where the combined samples may be processed as if the samples came from a single path. Accordingly, demodulation and other processing techniques (e.g., SIMO/MIMO) can be performed as if the collection of gateways and SDR server was a non-distributed system.

In some embodiments, separate nodes may each send a space-time coded signal that is received by the first and second gateways. Each of the gateways may send samples to a MIMO/SIMO module of the SDR server. The MIMO/SIMO module may separate, group or combine the samples based on the space-time codes, to improve signal transmission speed/throughput, SNR, or other parameters of the received signal.

Referring now to (509), the server may be configured by software-defined radio (SDR) software to perform processing of the separately received samples of the modulated signals to recover the data. The server may be configured by SDF software to perform any of the processing in (503), (505) and/or (507). The processing may include demodulation of the modulated signals received from one or both of the gateways. The processing may include demodulation of the modulated signals received by the first and/or second gateways. The processing may include demodulation of modulated signals recovered from the samples.

The SDR server may be configured to perform significant signal processing. The SDR server may be configured to perform signal processing steps deferred from the gateways. The SDR server may be configured to perform centralized signal processing for the plurality of gateways, by offloading common or computationally-significant processing from each gateway. The SDR server may be configured to perform signal processing of a combined set of signals received from a distributed set of antennas/gateways, e.g., to benefit from gateway/antenna "redundancy", diversity processing and/or interference rejection. Accordingly, the signal to noise ratio (SNR) of the node-to-gateway wireless links can be improved by combining signals received at multiple locations. SNR may be improved by combining signals that are received via different propagation paths and/or different propagation modes.

The SDR server may perform processing of the modulated signals comprising at least one of: signal filtering, interference rejection, decompression, encryption, decryption, forward error correction (FEC), coding, decoding, beamforming and antenna diversity processing. For example, the SDR server may decompress the compressed samples from the gateways, before combining the samples for further processing. The server may be configured by the SDR software to perform processing comprising at least one of single input multiple output (SIMO) and multiple input multiple output (MIMO) processing. The SDR server may provide various signal processing functions, including SIMO antenna diversity combining, FSK demodulation, discrete Fourier transform to resolve embedded tones, recovery of carrier phase for coherent demodulation, and/or timing recovery.

The SDR server may include or provide a web service to receive baseband sample blocks from the gateways. The SDR server may process the samples, and may deposit the resulting data records in a database for consumption by an end-user application. The sample blocks may be processed to extract the sample record and/or spectrogram data. As discussed earlier, the SDR server or MIMO/SIMO processing module may output a data record (e.g., post-SIMO processing) in a particular format for storage in the database. The SDR server may extract a decoded sensor report from a post-processed sample block. The SDR server may write the decoded sample records and spectrograms to a history database of the SDR server.

In some embodiments, the SDR server may perform event logging for debugging or diagnostics, and may provide web server control panel for configuration and monitoring. The SDR server may provide a web service to allow end-user applications to access the history database. An end-user may access some portion of the sensor data recovered at the SDR server through one or more end-user applications. An end-user application may retrieve sensor data from the SDR server's Sensor History Store and present it in a graphical format to an end-user.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A system for providing a distributed communications network, the system comprising:
   a first gateway receiving a first at least a portion of modulated signals of data wirelessly transmitted from a first node of a plurality of nodes, and performing sampling to generate first samples of the first at least a portion of the modulated signals;
   a second gateway receiving a second at least a portion of the modulated signals of the data wirelessly transmitted from the first node, and performing sampling to generate second samples of the second at least a portion of the modulated signals; and
   a server receiving the first samples from the first gateway and the second samples from the second gateway, the server configured by software-defined radio (SDR) software to combine the received first samples and second samples to recover the modulated signals of the data, and to demodulate the recovered modulated signals to recover the data.

2. The system of claim 1, wherein the first gateway receives an interfering signal from a source other than the first node.

3. The system of claim 2, wherein the generated first samples incorporate a portion of the interfering signal.

4. The system of claim 3, wherein the server removes the portion of the interfering signal from the first samples received from the first gateway.

5. The system of claim 2, wherein the second gateway receives all or part of the interfering signal, and the generated second samples incorporate a portion of the interfering signal.

6. The system of claim 5, wherein the server removes elements of the interfering signal from at least the first samples using the second samples.

7. The system of claim 2, wherein a third gateway receives all or part of the interfering signal, and generates third samples incorporating a portion of the interfering signal.

8. The system of claim 7, wherein the server removes elements of the interfering signal from at least the first samples using the third samples.

9. The system of claim 1, wherein the first gateway receives a signal wirelessly transmitted from a second node of the plurality of nodes.

10. The system of claim 9, wherein the second node comprises a source of signals with potential for collision with the modulated signals transmitted from the first node.

11. The system of claim 9, wherein the first gateway receives signals from the first node and the second node via a same radio frequency channel.

12. The system of claim 1, wherein at least one of the first gateway and the second gateway receives one of the modulated signals wirelessly transmitted from the first node at very high frequency (VHF) or ultra high frequency (UHF).

13. A method for providing a distributed communications network, comprising:
    receiving, by a first gateway, a first at least a portion of modulated signals of data wirelessly transmitted from a first node of a plurality of nodes;
    performing, by the first gateway, sampling to generate first samples of the first at least a portion of the modulated signals;
    receiving, by a second gateway, a second at least a portion of the modulated signals of the data wirelessly transmitted from the first node;
    performing, by the second gateway, sampling to generate second samples of the second at least a portion of the modulated signals;
    receiving, by the server, the first samples from the first gateway and the second samples from the second gateway;
    combining, by the server as configured by software-defined radio (SDR) software, the received first samples and second samples to recover the modulated signals; and
    demodulating, by the server, the recovered modulated signals to recover the data.

14. The method of claim 13, further comprising receiving, by the first gateway, an interfering signal from a source other than the first node.

15. The method of claim 14, wherein the generated first samples incorporate a portion of the interfering signal.

16. The method of claim 15, further comprising removing, by the server, the portion of the interfering signal from the first samples received from the first gateway.

17. The method of claim 14, further comprising receiving, by the second gateway, all or part of the interfering signal, wherein the generated second samples incorporate a portion of the interfering signal.

18. The method of claim 17, further comprising removing, by the server, elements of the interfering signal from at least the first samples using the second samples.

19. The method of claim 13, further comprising receiving, by the first gateway, a signal wirelessly transmitted from a second node of the plurality of nodes.

20. The method of claim 19, wherein the second node comprises a source of signals with potential for collision with the modulated signals transmitted from the first node.

* * * * *